United States Patent
Levitt et al.

US008882999B2

(10) Patent No.: US 8,882,999 B2
(45) Date of Patent: Nov. 11, 2014

(54) CLEANING ASSEMBLY FOR USE IN FLUID FILTRATION SYSTEMS

(75) Inventors: David J. Levitt, San Anselmo, CA (US); George D. Caffell, Moss Beach, CA (US); John H. Mallard, Saratoga, CA (US); Steven E. O'Reilly, Menlo Park, CA (US)

(73) Assignee: Dow Global Technologies LLC, Midland, MI (US)

(*) Notice: Subject to any disclaimer, the term of this patent is extended or adjusted under 35 U.S.C. 154(b) by 812 days.

(21) Appl. No.: 13/163,537

(22) Filed: Jun. 17, 2011

(65) Prior Publication Data
US 2012/0010063 A1 Jan. 12, 2012

Related U.S. Application Data

(60) Provisional application No. 61/355,989, filed on Jun. 17, 2010, provisional application No. 61/483,221, filed on May 6, 2011.

(51) Int. Cl.
| | |
|---|---|
| *B04C 5/22* | (2006.01) |
| *B04C 9/00* | (2006.01) |
| *B01D 21/00* | (2006.01) |
| *B01D 21/26* | (2006.01) |
| *B01D 17/02* | (2006.01) |
| *C02F 1/00* | (2006.01) |
| *C02F 1/38* | (2006.01) |
| *B01D 17/00* | (2006.01) |

(52) U.S. Cl.
CPC .............. *B04C 5/22* (2013.01); *B01D 17/0217* (2013.01); *B01D 17/10* (2013.01); *B01D 21/0006* (2013.01); *B04C 9/00* (2013.01); *C02F 1/001* (2013.01); *B01D 21/267* (2013.01); *B04C 2009/004* (2013.01); *C02F 1/38* (2013.01); *C02F 2201/003* (2013.01); *C02F 2303/16* (2013.01)
USPC .......... 210/107; 210/304; 210/512.1; 494/46; 494/83

(58) Field of Classification Search
CPC ...... B04C 5/22; B04C 9/00; B04C 2009/004; B01D 21/267; B01D 21/0006; B01D 17/0217; B01D 17/10; C02F 1/38; C02F 1/001; C02F 2303/16; C02F 2201/003
USPC .............. 210/788, 791, 806, 107, 304, 512.1; 494/37, 46, 83
See application file for complete search history.

(56) References Cited

U.S. PATENT DOCUMENTS

| | | | |
|---|---|---|---|
| 1,107,485 | A | 8/1914 | Bowser |
| 1,738,037 | A | 12/1929 | Collins |

(Continued)

FOREIGN PATENT DOCUMENTS

| | | |
|---|---|---|
| EP | 0375671 | 6/1990 |
| EP | 0475252 | 3/1992 |

(Continued)

OTHER PUBLICATIONS

DOW Water & Process Solutions, G. Onifer, Oct. 2010, Executive Summary: Clean Filtration Technologies, Inc Turboclone Filter.

(Continued)

*Primary Examiner* — David A Reifsnyder
(74) *Attorney, Agent, or Firm* — Edward W. Black

(57) ABSTRACT

Cleaning assemblies and particulate tolerant fluid bearings that are particularly well suited for use in centrifugal separation enhanced filtration devices are described. In one aspect of the invention, at least one bearing is arranged to carry a circulating cleaning assembly such that the cleaning assembly can rotate around a filter membrane during filtering operation of the filtration device. The bearing is preferably arranged to maintain the circulating cleaning assembly in a substantially coaxial alignment with the filter membrane and in a substantially stable longitudinal position relative to the filter membrane as the circulating cleaning assembly is rotated around the filter membrane. In another aspect of the invention a variety of particulate tolerant bearings are described.

14 Claims, 19 Drawing Sheets

(56) References Cited

U.S. PATENT DOCUMENTS

| | | |
|---|---|---|
| 1,919,653 A | 7/1933 | Hill |
| 2,733,855 A | 2/1956 | McCoy |
| 2,788,087 A | 4/1957 | Lenehan |
| 2,917,173 A | 12/1959 | Rakowsky |
| 3,061,098 A | 10/1962 | Brezinski |
| 3,137,552 A | 6/1964 | Weinand |
| 3,219,186 A | 11/1965 | Polhemus et al. |
| 3,248,045 A | 4/1966 | Prins |
| 3,285,422 A | 11/1966 | Wiley |
| 3,515,417 A | 6/1970 | Bowman |
| 3,529,724 A | 9/1970 | Maciula et al. |
| 4,120,783 A | 10/1978 | Baummer |
| 4,146,468 A | 3/1979 | Wilson |
| 4,159,073 A | 6/1979 | Liller |
| 4,178,258 A | 12/1979 | Papay et al. |
| 4,216,095 A | 8/1980 | Ruff |
| 4,298,465 A | 11/1981 | Druffel |
| 4,414,112 A | 11/1983 | Simpson et al. |
| 4,575,406 A | 3/1986 | Slafer |
| 4,651,540 A | 3/1987 | Morse |
| 4,662,909 A | 5/1987 | Durr |
| 4,698,156 A | 10/1987 | Bumpers |
| 4,887,331 A | 12/1989 | Thomas |
| 5,104,520 A | 4/1992 | Maronde et al. |
| 5,116,516 A | 5/1992 | Smisson |
| 5,188,238 A | 2/1993 | Smisson et al. |
| 5,227,061 A | 7/1993 | Bedsole |
| 5,277,705 A | 1/1994 | Anderson et al. |
| 5,407,584 A | 4/1995 | Broussard, Sr. |
| 5,478,484 A | 12/1995 | Michaluk |
| 5,593,043 A | 1/1997 | Ozmerih |
| 5,879,545 A | 3/1999 | Antoun |
| 5,972,215 A | 10/1999 | Kammel |
| 6,117,340 A | 9/2000 | Carstens |
| 6,210,457 B1 | 4/2001 | Siemers |
| 6,238,579 B1 | 5/2001 | Paxton et al. |
| 6,520,902 B1 | 2/2003 | Brown et al. |
| 6,896,720 B1 | 5/2005 | Arnold et al. |
| 7,077,799 B2 | 7/2006 | Gorham et al. |
| 7,166,230 B2 | 1/2007 | Nilsen et al. |
| 7,351,269 B2 | 4/2008 | Yau |
| 7,632,416 B2 | 12/2009 | Levitt et al. |
| 7,785,479 B1 | 8/2010 | Hosford |
| 7,854,779 B2 | 12/2010 | Oh |
| 7,896,169 B2 | 3/2011 | Levitt et al. |
| 8,201,697 B2 | 6/2012 | Levitt et al. |
| 8,701,896 B2 * | 4/2014 | Levitt et al. ............ 210/512.1 |
| 2003/0029790 A1 | 2/2003 | Templeton |
| 2003/0121122 A1 | 7/2003 | Carlstedt et al. |
| 2003/0221996 A1 | 12/2003 | Svoronos et al. |
| 2007/0039900 A1* | 2/2007 | Levitt ....................... 210/787 |
| 2007/0045168 A1 | 3/2007 | Levitt et al. |
| 2007/0075001 A1 | 4/2007 | Knol |
| 2007/0187328 A1 | 8/2007 | Gordon |
| 2010/0044309 A1 | 2/2010 | Lee |
| 2011/0220586 A1 | 9/2011 | Levitt |
| 2012/0145609 A1 | 6/2012 | Caffell et al. |

FOREIGN PATENT DOCUMENTS

| | | |
|---|---|---|
| EP | 0566792 | 10/1993 |
| FR | 2791904 | 10/2000 |
| GB | 2309182 | 7/1997 |
| GB | 2423264 | 8/2006 |
| KR | 10-0899416 | 5/2009 |
| WO | 0218056 | 3/2002 |
| WO | 03026832 | 4/2003 |
| WO | 2004064978 | 8/2004 |
| WO | 2012078925 | 6/2012 |

OTHER PUBLICATIONS

Clean Filtration Technologies, Inc. CFT Turboclone Demo System, 2010.

Clean Filtration Technologies, Inc. CFT Turboclone TC-201 Technical Datasheet, 2010.

Search Report dated Oct. 27, 2011 from International Application No. PCT/US11/40986.

Written Opinion dated Oct. 27, 2011 from International Application No. PCT/US11/40986.

* cited by examiner

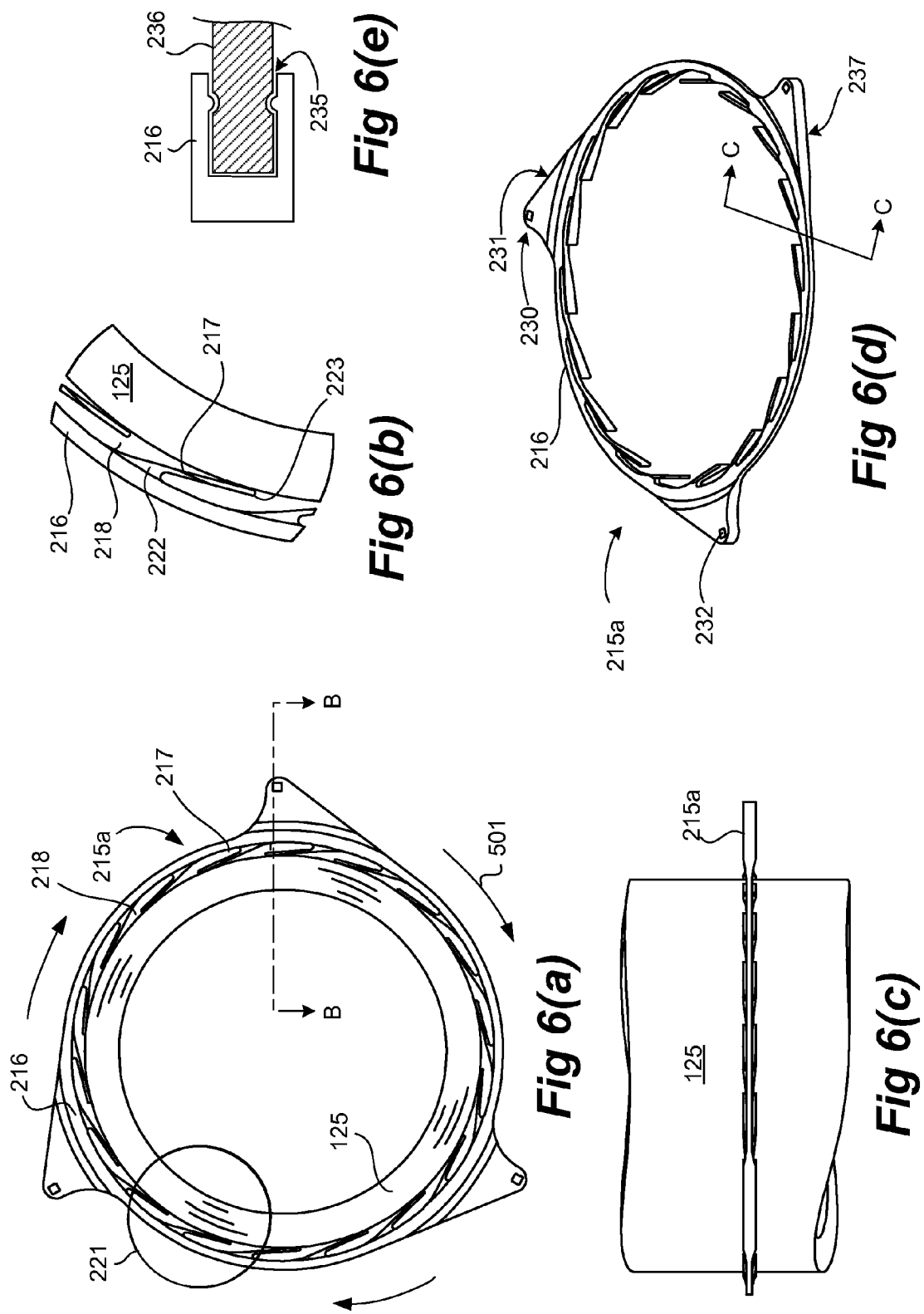

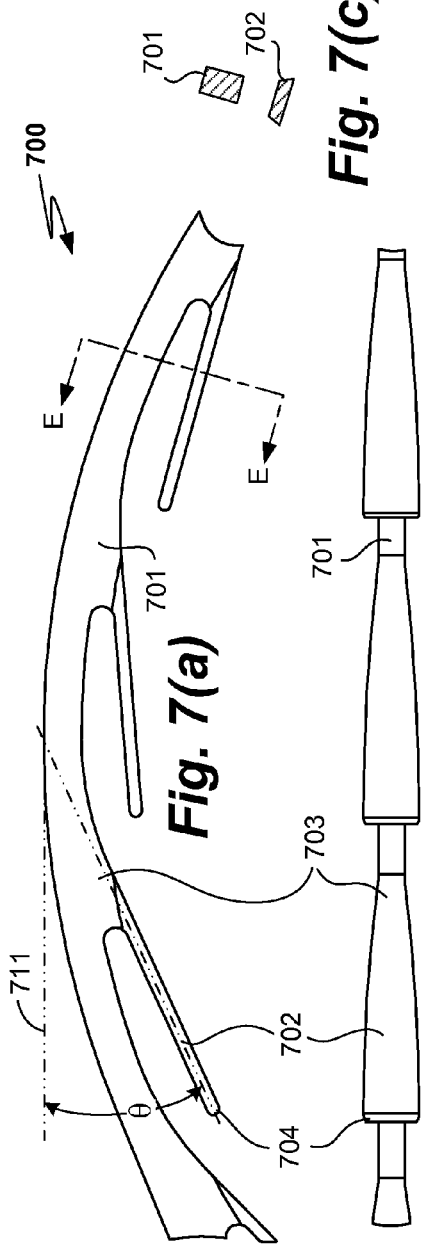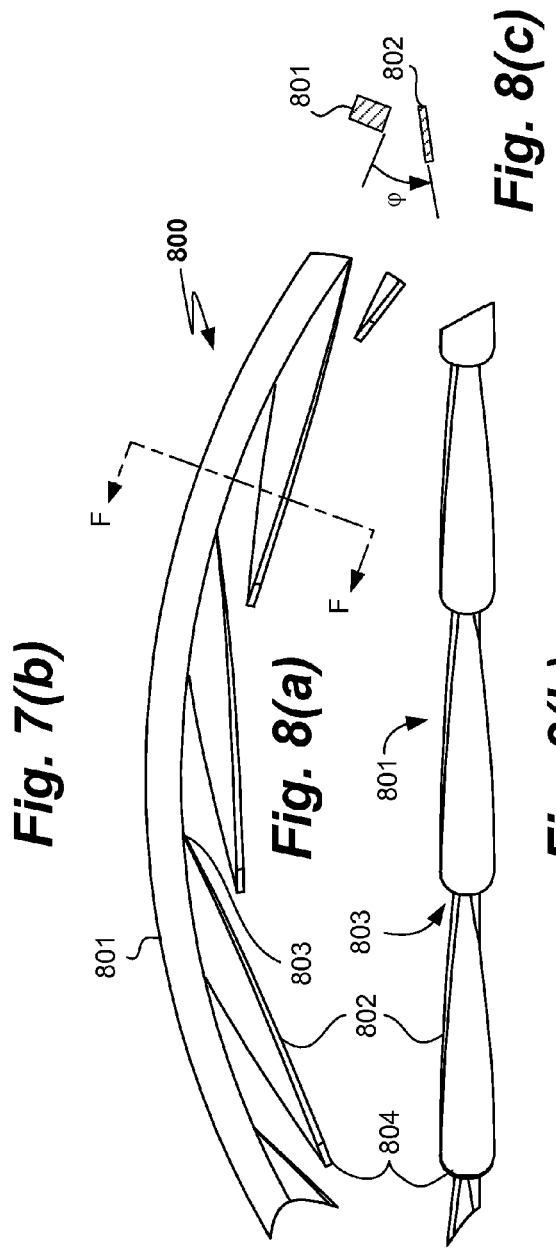

CLEANING ASSEMBLY FOR USE IN FLUID FILTRATION SYSTEMS

CROSS REFERENCE TO RELATED APPLICATIONS

This application claims priority of U.S. Provisional Patent Application Nos. 61/355,989 filed Jun. 17, 2010 and 61/483,221 filed May 6, 2011, each of which is incorporated herein by reference.

FIELD OF THE INVENTION

The present invention generally relates to filter cleaning assemblies and particulate tolerant fluid bearings suitable for use in centrifugal separation enhanced filtration. The described devices may be used in a variety of water treatment, fluid filtering and particle separation applications.

BACKGROUND OF THE INVENTION

A wide range of technologies are currently used to treat, purify and/or filter water and other liquids. Many such technologies require a relatively large amount of physical space and/or require the use of consumable filters that add to operational costs. For example, many drinking water treatment applications utilize settling ponds in combination with a series of screens and filters of progressively decreasing pore size to remove suspended solid particles from water.

More recently hydroclone based filtration has been proposed to separate suspended particles from water and other fluid mediums. Hydroclones operate by introducing water into a generally conically shaped chamber to create a vortex within the chamber. Generally, the influent water is introduced near the top of a conical chamber and an effluent stream is discharged near the bottom of the chamber. Centrifugal force tends to cause heavier particles to move towards the periphery of the vortex. As a result the water near the center of the vortex tends to be cleaner than water at the periphery of the vortex. Commonly assigned U.S. Pat. No. 7,632,416 describes an improved hydroclone based filtration system having a filter assembly positioned in a central region of the hydroclone. With the described arrangement, relatively cleaner water can be drawn from the central region of the hydroclone after passing through the filter. To further improve the efficiency of the hydroclone filtration, the '416 patent proposes the use of a circulating cleaning assembly to help clean the filter assembly during operation of the hydroclone.

Although existing water filtering systems and existing hydroclones work well for their intended uses, there are continuing efforts to provide improved and/or more cost effective purification and/or filtering devices that can meet the needs of various specific applications. In one aspect, the present invention relates generally to improved filter cleaning assemblies suitable for use in centrifugal, hydroclone and other filtration systems.

SUMMARY OF THE INVENTION

Cleaning assemblies and particulate tolerant fluid bearings that are particularly well suited for use in centrifugal separation enhanced filtration devices are described.

In one aspect of the invention, at least one bearing is arranged to carry a circulating cleaning assembly such that the cleaning assembly can rotate around a filter membrane during filtering operation of the filtration device. The bearing is preferably arranged to maintain the circulating cleaning assembly in a substantially coaxial alignment with the filter membrane and in a substantially stable longitudinal position relative to the filter membrane as the circulating cleaning assembly is rotated around the filter membrane. In another aspect of the invention a variety of particulate tolerant bearings are described.

In some embodiments, the bearing takes the form of a bearing plate journaled about a race and arranged to rotate together with the cleaning assembly. In some implementations, the bearing plate may be sandwiched between a pair of adapter plates that constrain axial movement of the bearing plate.

In some embodiments, a single bearing (e.g. a bearing plate) may be used, whereas in others a pair of space apart bearings are arranged to support the cleaning assembly therebetween.

The bearing may include a variety of features that facilitate use in high particulate applications. In some embodiments, these may include grooves and holes in a bearing plate that help remove particulates from active surfaces of the bearing. In other embodiments, these may include flexible members that help prevent binding of the bearing and help self-center the bearing.

When desired, the bearing may include a multiplicity of circumferentially spaced apart cleaning structure support arms. Each support arm may be arranged to support a distinct cleaning structures, with each cleaning structure including an associated cleaning element (e.g., a brush or squeegee) arranged to swipe over or against the filter membrane to help clean the filter membrane as the cleaning assembly rotates relative to the filter.

The described cleaning assemblies are particularly well suited for use in cleaning surface filters used in a centrifugal separation enhanced filtration devices including hydroclone filtration devices, cylindrical centrifugal enhanced filtration device, and other cross-flow filtration applications.

BRIEF DESCRIPTION OF THE DRAWINGS

The invention, together with further objects and advantages thereof, may best be understood by reference to the following description taken in conjunction with the accompanying drawings in which:

FIGS. 6(a)-6(e) are various diagrammatic views illustrating the configuration of a representative embodiment of a particulate tolerant bearing in accordance with the principles of the invention.

FIGS. 7(a)-7(c) are various diagrammatic views illustrating the flexible member configurations of a representative embodiment of a particulate tolerant bearing in accordance with the principles of the invention.

FIGS. 8(a)-8(c) are various diagrammatic views illustrating the flexible member configurations of another representative embodiment of a particulate tolerant bearing in accordance with the principles of the invention.

The depictions in the figures are diagrammatic and not always to scale.

DETAILED DESCRIPTION OF THE PREFERRED EMBODIMENTS

The present inventions relate generally to cleaning assemblies for use in cleaning filters and to particulate tolerant fluid bearings suitable for use in such assemblies. In some embodiments, the cleaning assemblies are circulating cleaning assemblies suited for use in fluid filtration systems such as hydroclone and other centrifugal based fluid filtration systems. The described devices may be used in a variety of water treatment, fluid filtering and particle separation applications.

Figure 1:
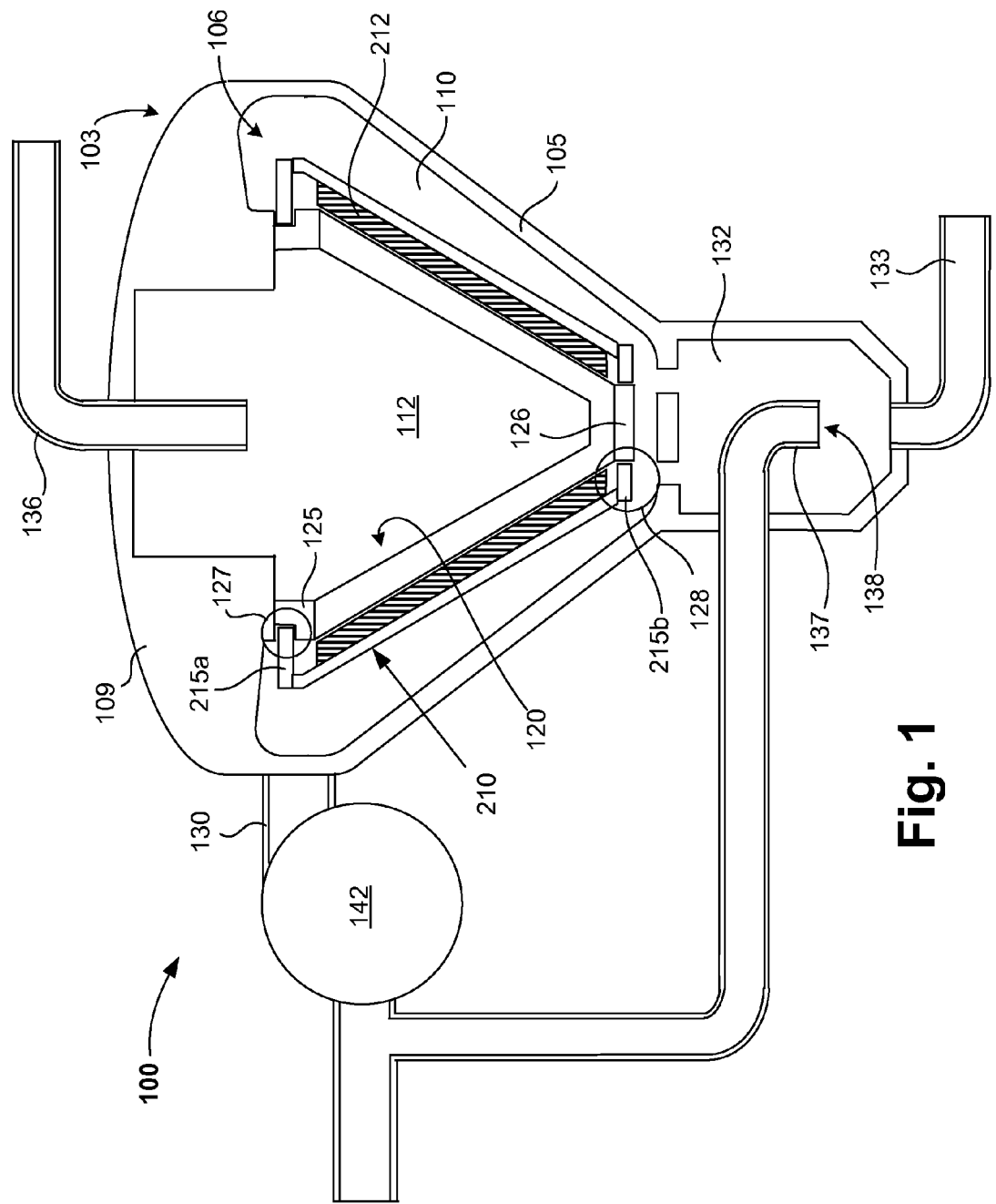
FIG. 1 is a functional schematic diagram of a hydroclone based filtering system of the present invention.
Figure 2:
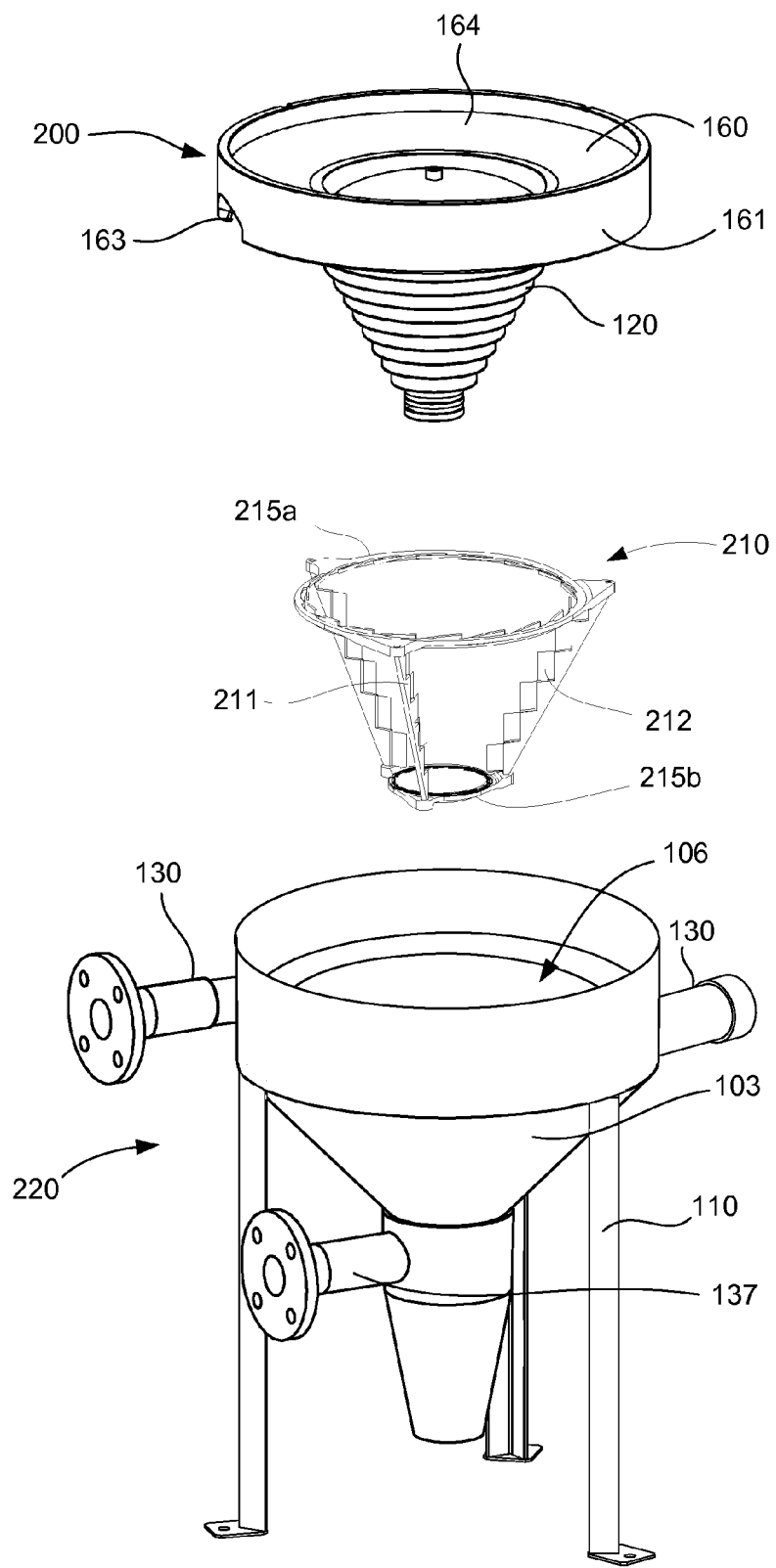
FIG. 2 is an exploded perspective view of the hydroclone based filtering system illustrated in FIG. 2.
Figure 3:
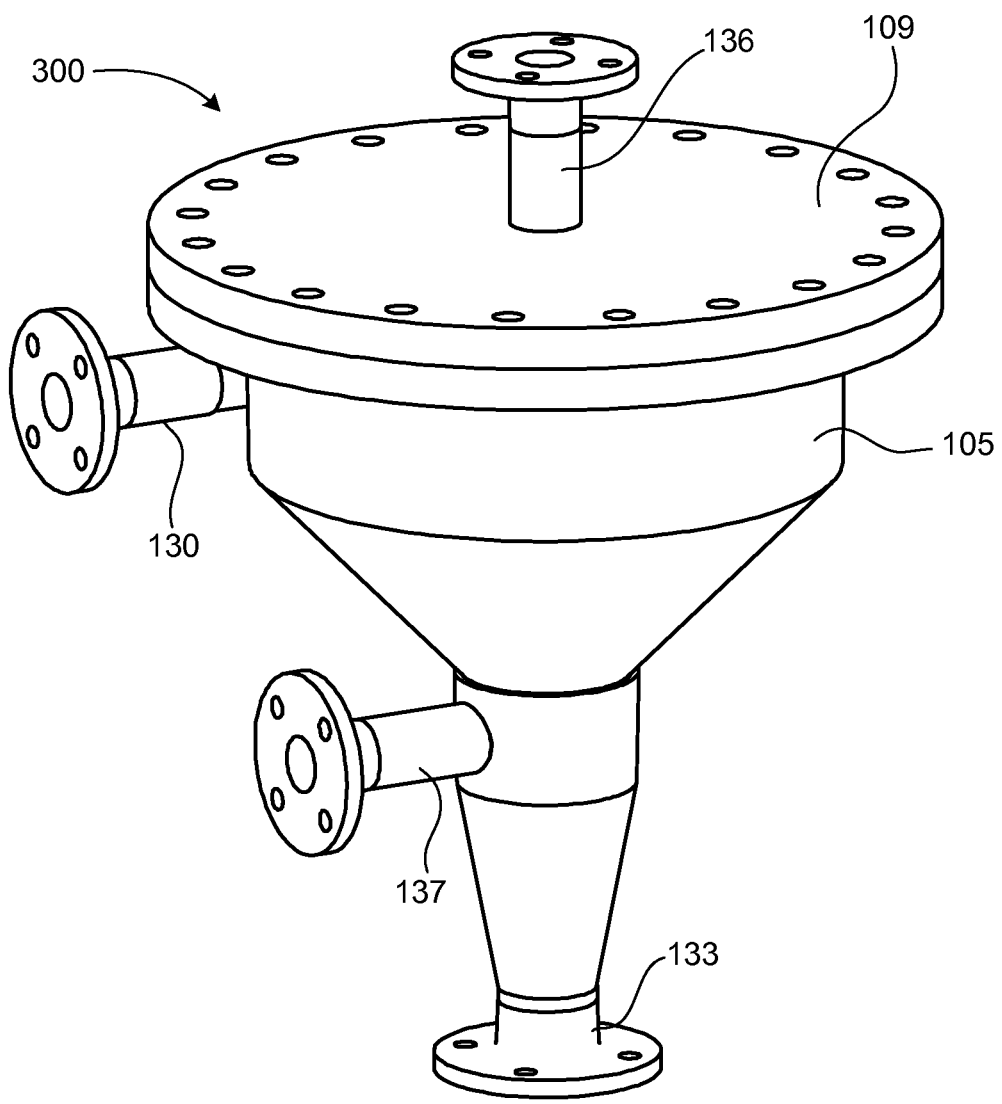
FIG. 3 is a diagrammatic external perspective view of a hydroclone based filtering system in accordance with another embodiment of the invention.

Referring initially to FIGS. 1-3, a hydroclone filter system 100 that includes a circulating cleaning assembly 210 in accordance with one embodiment of the invention will be described. In the illustrated embodiment the hydroclone based filtration system 100 includes a housing 103 having chamber walls 105 and a lid 109. The chamber walls 105 define a tapered (e.g. frusto-conically shaped) fluid compartment 106 and the lid 109 covers the fluid compartment 106. The housing 103 can be supported by a stand 111 that can take any suitable form. In some embodiments, the hydroclone may not require a stand at all. A filter element 120 (shown in FIG. 1 as a substantially frusto-conical filter element) of the filter assembly 200 is positioned within the fluid compartment 106. As will be described in more detail below, the filter element 120 may be a generally conical filter, a stepped filter, a cylindrical filter, or other suitable shapes. The filter assembly is positioned centrally within the fluid compartment 106 so that the filter is spaced apart from the peripheral chamber walls 105. The region between the chamber walls 105 and the filter element 120 is defined as a hydroclone chamber 110 and the region in the central region of the filter is defined as a filtered fluid chamber 112.

To elaborate, one particular embodiment of a filter assembly 200 comprises a filter element 120 configured as a cross-flow filter. In one such embodiment, the filter element includes a microfilter having a multiplicity of fine elongate filtration apertures suitable for filtering very minute particulate from a fluid. One such filter element is discussed, for example, in more detail in U.S. Pat. No. 7,632,416 (which is incorporated herein by reference).

Functionally, the hydroclone 100 has four main openings. The openings include a fluid inlet 130 located near the wide (top) end of the hydroclone chamber 110, an effluent outlet 133 located below the narrow (bottom) end of the fluid compartment 106/hydroclone chamber 110, an optional recirculation outlet 137 also located below a lower portion of the hydroclone chamber 110, and a filtered fluid outlet 136 from the filtered fluid chamber 112. In the embodiment illustrated in FIGS. 1-3, the filtered fluid outlet 136 is located at the upper end of the hydroclone (e.g., in through lid 109 in some embodiments), although in alternative embodiments the filtered fluid outlet may drain near the narrow (bottom) end of the hydroclone. The fluid inlet 130 is preferably arranged such that fluid entering the hydroclone chamber 110 flows substantially tangentially into a region at the wide (top) end of the fluid compartment 106 between the chamber wall 105 and the filter 120 and generally moves through the hydroclone chamber 110 in a forced vortex towards the bottom of the hydroclone such that it can drain into an outlet chamber 132 of the hydroclone 100. The effluent outlet 133 is located at a bottom portion of the outlet chamber 132 (which in turn is located below the narrow end of the hydroclone chamber). Some of the fluid entering the hydroclone chamber will pass through the filter element 120 into the filtered fluid chamber 112. Filtered fluid (e.g., clean water) exits the filtered fluid chamber through the filtered fluid outlet 136. Any fluid in the hydroclone that does not pass through the filter drops into outlet chamber 132 and is either recirculated via recirculation line 137 or exits the hydroclone through the effluent outlet 133.

There are a number of aspects of the illustrated hydroclone that make it work particularly well for water (and other fluid) filtering applications. Hydroclone based separators are known. Generally, they work on the principle that in the environment of a vortex, heavier particles will tend to migrate towards the exterior of the vortex, while liquids and lighter particles tend to move towards the center of the vortex. With this arrangement, an effluent outlet near the bottom peripheral end of the separator can be used to remove the particles, while an outlet that draws from a central region of the separator can be used to remove the liquid. In a hydroclone based separator, the inlet fluid is typically water (or another suitable liquid) and the hydroclone may be used to concentrate particles in the effluent outlet stream while outputting relative clean water that is drawn from the center of the hydroclone. In the present invention, the presence of the filter element 120 further assists the separation of the particles and other contaminants from the center region of the hydroclone and thus the clean water outlet discharges filtered water. The use of a central filter can be quite effective at improving the cleanliness of the discharged clean water.

The filtering characteristics of the described system can be varied significantly by controlling, among other things, the relative flow rates of the effluent and filtered fluid outlets 133, 136 as well as differential pressures between chambers 110 and 112. Additionally, system efficiencies and the concentrating characteristics of the system can be varied significantly by feeding at least some of the effluent stream back into the hydroclone (e.g., using 137) and by controlling the relative rates and nature of such feedback.

The filter element 120 is preferably a surface filter that is not designed to trap particles and therefore the filtering has the effect of increasing the concentration of particles in the effluent stream relative to the inlet fluid. The filtering characteristics of the described system can be varied significantly by controlling the relative flow rates of the effluent and filtered fluid outlets 133, 136. The concentrating characteristics of the system can also be varied significantly by feeding at least some of the effluent stream back into the hydroclone and by controlling the relative rates and nature of such feedback.

Although surface filters are generally not designed to collect particles, in practice, over time, any filter design will experience some clogging or blockage. Generally, the flow dynamics of the vortex flowing across the filter helps prevent large particles (i.e., particulates that are large relative to the minimum dimension of the filter openings) from clogging the filter openings (e.g. slots, pores, etc.). This is because the current flowing across the filter surface tends to push the large particulates aside so it is difficult for the large particles to lodge within a filter opening. That is forces applied to the trapped particles by the cross-flow of the vortex (the filter acts as a cross flow filter) are sufficient to dislodge the particles. However, in other circumstances, the forces applied by the vortex may not be sufficient to dislodge the particles. In practice it has been observed that the particulates that are most likely to affirmatively lodge within a filter pore are particles that have a dimension that is just slightly larger than the minimum pore dimension. These particles tend to be small enough to be sucked partially into a filter pore but are too large to pass through the opening. Since they are relatively small, they may not be exposed enough to be swept away by the vortex flowing across the filter. Thus, if no precautions are taken, the filter will tend clog over time.

In order to further reduce the filter clogging rate, a filter cleaning system may be incorporated into the hydroclone design. In the embodiments illustrated in FIGS. 1 and 2, a circulating (rotating) cleaning assembly 210 is positioned within the hydroclone chamber 110 to facilitate such cleaning. The rotating cleaning assembly 210 is arranged to clean the filter 120 during operation of the device. The cleaning assembly 210 includes a pair of spaced apart bearings 215a, 215b (collectively referred to herein as 215) and cleaning structure 212 (e.g. brushes, squeegees, etc.) that are arranged to assist in the cleaning of the filter as the assembly 210 is rotated around the filter.

The general operation of hydroclones and various advantages of using a circulating cleaning assembly to clean the filter are described in some detail in U.S. Pat. No. 7,632,416 (which is incorporated herein by reference). In one of the embodiments described in the '416 patent, the cleaning assembly is driven by the hydroclone vortex and peripherally mounted rollers are provided to assist with the rotation of the cleaning assembly. In such an arrangement, the rollers help stabilize the cleaning assembly by rolling along the walls 105 of the hydroclone chamber as the cleaning assembly rotates around the filter cage.

Due to the nature of hydroclone operation, the vortex increases the concentration of dense particulate matter at the periphery of the hydroclone chamber thereby increasing the particulate concentration near the walls 105. Indeed, in some applications, the particle concentration near the chamber walls may at times be sufficiently high to effectively constitute a sludge. Such an increased particulate concentration near the chamber walls can sometimes impede the rollers thereby adversely affecting performance of the cleaning assembly. Such problems are particularly noticeable when the hydroclone is run in a manner that has a high clean water recovery fraction.

Referring next to FIG. 1 an improved filter cleaning assembly 210 in accordance with one embodiment of the present invention will be described. The cleaning assembly 210 includes a pair of spaced apart particulate tolerant bearings 215, 216 that carry a plurality of cleaning structures, which in the illustrated embodiment take the form of brush assemblies 220.

Bearings (215a, 215b) are arranged to enable rotation around the filter. These bearings are more centrally located, away from the edges and walls 105, and thus away from the highest concentration of particulates. In one embodiment (for example, that illustrated in FIG. 1), the bearings (215a, 215b) are centrally located and rotatably engaged with associated support surfaces 125, 126. The support surfaces 125, 126 provide centralized positioning of the assembly 210 and of the bearings 215, so that they maintain a centralized position in the chamber 110 as they rotate around the filter 120.

The support surfaces 125, 126 are also configured to maintain the longitudinal position of the assembly 210 so that it does not rise and fall during operation. As used here, longitudinal refers to motion up and down the radial axis of rotation for the cleaning assembly.

Figure 4A:
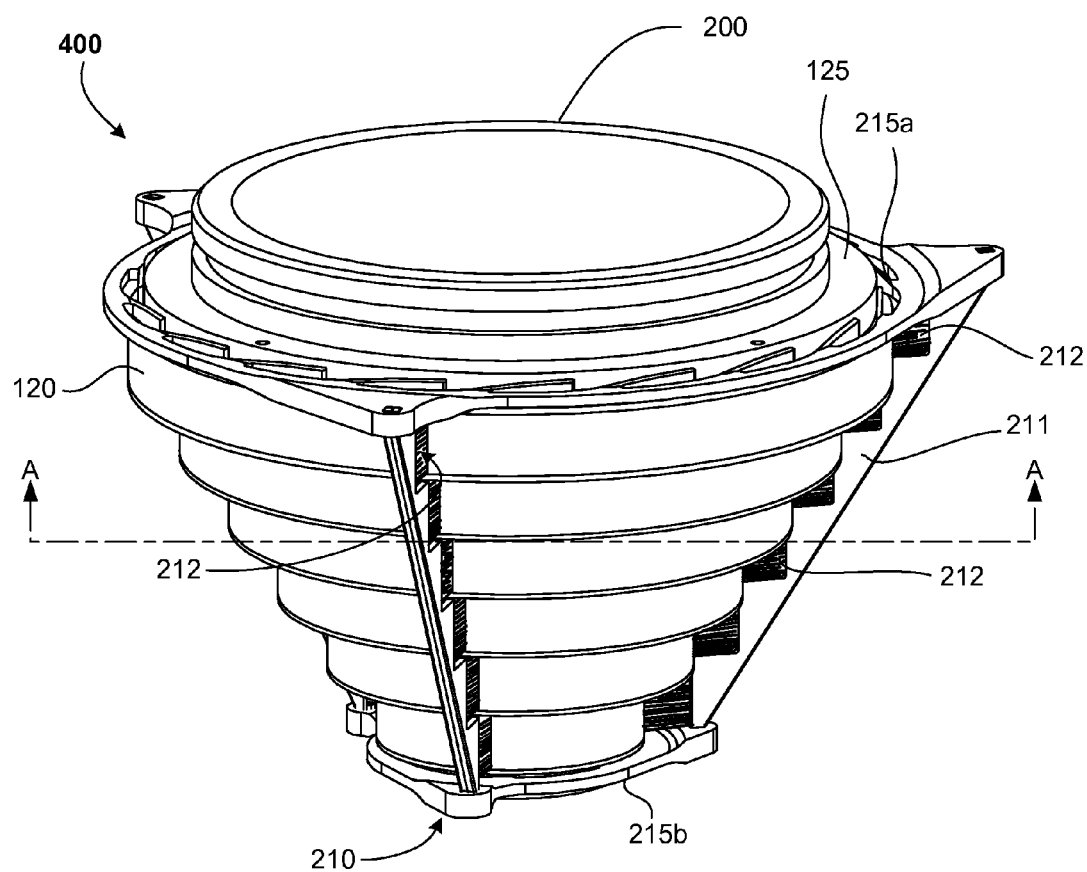
FIG. 4(a) is a diagrammatic perspective view of a stepped filter assembly nested with a circulating cleaning assembly illustrating an embodiment of a particulate tolerant bearing as described herein.
Figure 4B:
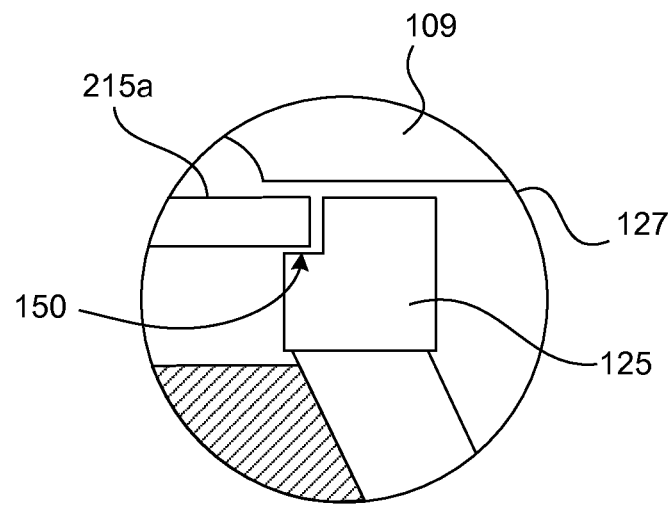
FIGS. 4(b)-4(d) are simplified section views that illustrate various embodiments used to generate longitudinal stability in a circulating cleaning assembly of the present invention; and close ups of guide feature embodiments used to provide longitudinal stability for a cleaning assemble in accordance with some embodiments of the present invention.

Reference to FIGS. 1 & 4(b) show an upper bearing 215a engaged with a guide feature (circled generally by 127). In FIGS. 1 & 4(b), the guide feature 127 can include a simple notch 150 (or rabbet) formed in a support 125 of the filter assembly 200. In the depicted embodiment, the rabbet 150 engages the associated particulate tolerant bearing 215a and can prevent the bearing (and accordingly, the cleaning assembly 210) from moving longitudinally downward. The rabbet 150 extends around the entire support 125 to form a path in which the bearing 215a can rotate. In this embodiment, the lid 109 of the chamber can also form an aspect of the guide feature 127. Thus, in the depicted embodiment, the upward longitudinal motion can be restricted by the lid 109 and the downward motion by the presence of the notch 150. In one embodiment (such as shown in FIG. 1), a single feature 127 can restrict the longitudinal motion in both directions.

In another approach, a lid 109 can be used to restrict upward longitudinal movement whereas a similar blocking surface (guide feature) near the bottom of a bottom bearing 215b can be positioned under the bearing to restrict downward motion of the lower bearing 215b. Thus, the two bearings 215a, 215b, and the surfaces can operate cooperatively to restrict upward and downward longitudinal movement of the cleaning assembly 210 relative to the adjacent filter element 120.

Figure 4C:
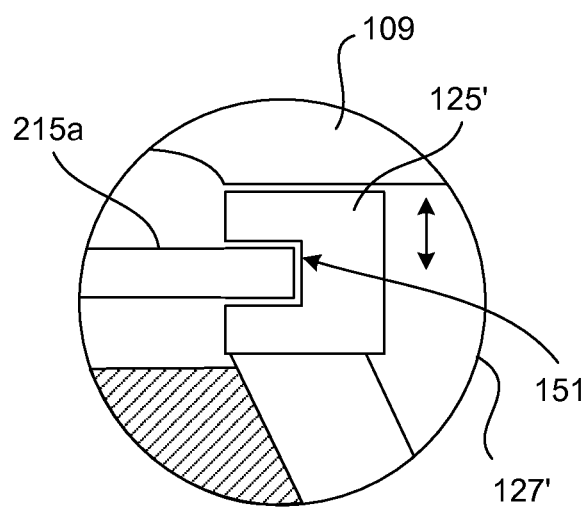

To continue, FIG. 4(c) shows one of many other alternative approaches. A groove 151 is formed in the support 125. The groove 151 extends completely around the support 125' to provide a rotation path for the bearing 215a. In the depicted embodiment, the upper and lower inner surfaces of the groove prevent substantial upward and downward longitudinal movement. As above, in this embodiment, the single feature 127' restricts the longitudinal motion in both directions.

Figure 4D:
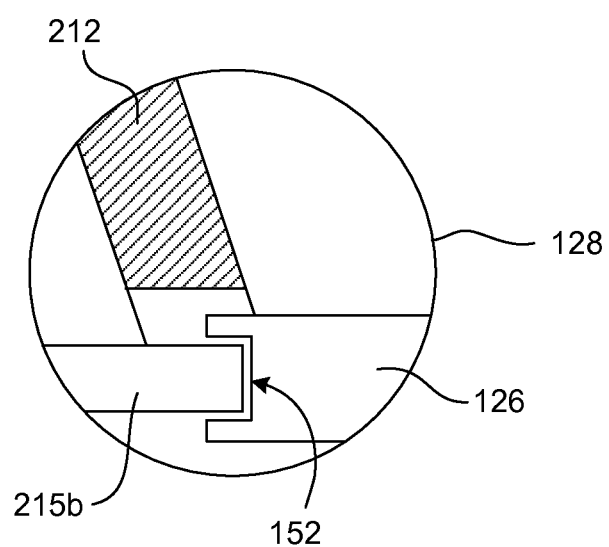

In another approach, FIGS. 1 & 4(d) show another, lower guide feature 128, positioned to engage a lower bearing 215b. In this embodiment, the feature is a groove 152 formed in the support 126. As with the embodiments described above, the groove 152 can extend completely around the support 126 to provide a rotation path for the bearing 215b. In the embodiment FIG. 4(d), show, the upper and lower inner surfaces of the groove 152 can also prevent substantial upward and downward longitudinal movement of bearing 215b. As above, in this embodiment, the single feature 128 restricts the longitudinal motion in both directions.

Generally (but not exclusively), the guide features (e.g., 127, 128) can be employed cooperatively to restrict the up and down motion of the cleaning assembly and limit vibration such that the cleaning elements 212 maintain the desired distance from the filter element 120 to effectively assist in the cleaning of the filter element.

It is pointed out that a wide assortment of suitable guide features 127, 128 will be apparent to the skilled man. Thus, the arrangement of the upper bearing 215a and lower bearing 215b and guide features 127, 128 serve to enable easy rotation of the assembly 210 around the filter 120 in a desired manner.

The bearings 215 also serve to maintain the assembly 210 in a substantially concentric arrangement with the filter 120. The, the arrangement of the bearings 215a, 215b and the support surfaces 125, 126 serve to self-centralize the assembly 210 with the filter 120 as well as maintain substantial longitudinal alignment of the assembly 210 with respect to the filter 120. Moreover, as will be discussed in more detail elsewhere in this patent, the particulate tolerant bearings 215a, 215b are configured to demonstrate properties of good wear resistance. The self-centralizing quality of the bearings 215 enable the cleaning assembly 210 to be maintained in substantially concentric alignment with the filter 120 during operation. The combination of bearings 215a, 215b, support surfaces 125, 126, and assembly 210 all serve to maintain the cleaning surfaces 212 of the assembly 210 at substantially the same distance and orientation with respect to the filter 120.

Thus, a cleaning assembly 210 having an arrangement of one or more bearings 215 arranged in association with support surfaces (e.g., 125, 126) and associated bearing securing features (e.g., 127) demonstrates good alignment with an associated filter element. Accordingly, despite changing fluid vortex velocities or particulate concentrations, the cleaning assembly 210 maintains a relatively stable coaxial and longitudinal alignment with the filter element 120. In particular, the bearing members enable the cleaning assembly to maintain a substantially central alignment with the filter despite varying operating conditions. Moreover, the resilient construction and geometry of the members enables the self centralizing feature of the bearing to be maintained even as the bearings undergo wear. Also, due to the longitudinal stability imparted to the bearings the up and down motion of the cleaning assembly is minimizing enabling the cleaning surfaces of the assembly to be maintained at an intended operating distance from the filter and prevent from wobbling or other misalignments with the filter. This maintains maximum cleaning performance over a wide range of cleaning environments.

FIG. 2 is a general exploded view of a portion of the hydroclone filtration apparatus including a filter assembly 200, a circulating cleaning assembly 210, and a body 220 of the hydroclone (with the lid removed for ease of explanation).

In this embodiment of a filter assembly 200, an upper intake structure 160 can be coupled with a lid such that the whole can be readily be inserted into and removed from the fluid chamber 106 as a single unit. In one embodiment, the lid can be attached to the chamber 220 using a hinged arrangement. Other arrangements are possible. This arrangement is particularly beneficial for assembly and maintenance. The intake structure 160 can include an outer wall 161, an intake port 163 in the outer wall, a sloped inlet ramp 164 that angles downward in the influent fluid flow direction. This downward angle can be used to direct an influent fluid into the hydroclone to initiate a vortex fluid flow in the chamber wall of the housing 103. Such a configuration, although advantageous, is not required to operate the invention. It is pointed out that the intake port 163 is generally aligned to receive inflowing fluid from a fluid inlet 130. The filter assembly 200 can be easily lifted into and out of the fluid chamber 106. The geometry and function of the intake structure 160 is well described in the art (e.g., '416 incorporated above).

Commonly, the combined filter assembly 200 and circulating cleaning assembly 210 is inserted into the chamber 106. This combined filter assembly 200 and circulating cleaning assembly 210 is sized to fit within the chamber 106 and also configured to conform to the generally tapered profile of the filter 120 and also to the profile of the chamber 106. Importantly, the cleaning assembly is sized such that it can rotate around the filter 120 during ordinary operation of a sealed hydroclone 100. The cleaning assembly 210 generally includes a number of frame elements 211 upon which at least one cleaning structure 212 is attached. In this depicted embodiment, the frame element is configured as a stepped frame element 211 having a plurality of steps. Such an embodiment is well suited to use with a stepped filter assembly (such as depicted by 120). In such an approach, a number of cleaning structures 212 are used. For example, one structure 212 per step.

Importantly, the upper particulate tolerant bearing 215a is arranged at a top portion of the assembly 210. This bearing is accompanied by a similar, but generally smaller bearing 215b at bottom portion of the assembly. These bearings 215 rotatably engage with inner support surfaces (125, 126). In one embodiment, the support surfaces 125, 126 can optionally form a part of the filter assembly 200 or specifically the filter element 120. However, it is specifically pointed out that the support surfaces 125, 126 are not required to form part of the filter assembly 200 and can be otherwise configured.

Referring again to FIG. 2, the cleaning structure can employ many different cleaning surface configurations in accordance with the principles of the present invention. For example, in some embodiments, the cleaning structures each comprise a single surface while other embodiments may employ a plurality of such structures (e.g., the many cleaning structures 212 of FIG. 4(a)). A facing surface of such cleaning structures generally conforms to the shape of the filter.

FIG. 3 illustrates a hydroclone 300 embodiment, such as described in FIG. 2 in a fully assembled and closed configuration. In the depicted embodiment, the lid 109 is closed and secured to the lower hydroclone chamber 105. The lid can be bolted in place, latched, or otherwise secured to form a good seal. The various inlets and outlets (e.g., 130, 133, 136, 137) are shown and in installation would be connected with the appropriate electronics and power systems as well as plumbed with the necessary pumps, valves, and other associated plumbing to facilitate fluid inflow and outflow in a manner sufficient to provide unfiltered influent, recirculated fluid, unfiltered effluent and filtered effluent.

FIG. 4(a) is an illustration showing a "nested" assembly 400 embodiment which depicts the arrangement of filter assembly 200 nested inside a cleaning assembly 210 as it would be in an operating arrangement of the hydroclone. Here, a stepped filter element 120 is nested inside the cleaning assembly 210 and secured in place using a set of particulate tolerant fluid bearings (e.g., upper bearing 215a and lower bearing 215b (collectively 215)). The cleaning structures 212 are coupled with a frame element 211 comprising part of the assembly 210. Additionally, the bearings 215 are coupled with the frame element 211. The bearings 215 are rotatably coupled with associated support surfaces (e.g., upper support surface 125) stabilize the assembly 210 in a centralized, longitudinally aligned, rotationally enabled operating position with respect to the filter 120.

Additionally, in one embodiment, by positioning of the bearings 215 nearer the center of a vortex flow rather than at the edge of the vortex (i.e., by positioning the bearings 215 away from the chamber wall 105) the bearings are positioned away from the particulate dense outer portions of the vortex. In particular, the inventors note that in some prior approaches, outer roller bearings are rotated along the chamber wall 105 as the cleaning assembly was spun. While, this worked well enough for some fluid environments, in fluids with higher particulate concentration, such an approach encounters certain operating difficulties. One of the features of vortex filtration is that dense filtrate is moved to the outer edges of a vortex during hydroclone operation. Because the particulate concentration is high at the outer edges of the chamber (near the chamber walls 105) the particulates can impede the rotation of the roller bearings at the outer portion of the rotating cleaning assemblies. This can reduce the rotational speed of the cleaning element which in turn reduces its ability to clean the filter element 120 thereby reducing the filtration efficiency of the hydroclone. Another problem sometimes encountered with such rollers is that they tend to be somewhat vulnerable to contamination induced binding and failure. By moving a bearing 215 away from the outer edge of the vortex and moving it is toward the middle of the vortex, it is moved away from a region of highest particulate concentrations to a region of very low particulate concentration. This has several operational advantages.

It should be pointed out that the cooperative arrangement of bearings 215a, 215b, support surfaces 125, 126, and the filter element 120 provide several other advantages as well. For example, the support surfaces can be configured to substantially limit vertical (longitudinal) movement of the bearings 215a, 215b and therefore the cleaning assembly. The bearing securing features, as noted in FIG. 1, can be formed in one or both of the support surfaces (e.g., 125, 126) or elsewhere to prevent excessive longitudinal drift of the bearings 215a, 215b. Moreover, one or more of the bearings 215a, 215b can have an associated bearing securing feature 127, 128. The self-centralizing feature of the bearings 215 has the advantage of longitudinally and coaxially stabilizing the cleaning assembly 210 to help maintain the cleaning assembly's position relative to the filter 120. Thus, the bearings 215a, 215b are arranged to hold and maintain the cleaning assembly in a stable orientation as it is rotated around the filter during operation of the hydroclone. For example, in embodiments where it is desired that the cleaning surfaces 212 remain in contact with (or at a desired operational distance from) the filter 120 during cleaning operations, the bearings 215 and support surfaces 125, 126 cooperate to maintain the cleaning assembly 210 in an orientation such that the cleaning surfaces 212 always maintain the desired contact with or operational distance from the filter element 120 as they rotate around the filter.

In some embodiments, the bearings 215, support surfaces (e.g., 125, 126) and securing features 127 are arranged to press the one or more cleaning surfaces 212 against the filter element 120 so that substantially all of the cleaning structures 212 are pressed against the filter element 120 at substantially the same pressure at substantially all locations. In other embodiments, the bearings 215, support surfaces (e.g., 125, 126) and securing features 127, 128 can be arranged to maintain the cleaning surfaces at a pre-specified distance from the filter element 120 so that substantially all of the cleaning surface lie at a specified desired distance from the filter element 120.

Generally (but not exclusively), the guide features (e.g., 127, 128) can be employed cooperatively to restrict the longitudinal motion of the cleaning assembly 210 and limit vibration such that the cleaning elements 212 maintain the desired distance from the filter element 120 to effectively assist in the cleaning of the filter element.

Also, a wide assortment of suitable alternative guide features 127, 128 will be apparent to those skilled in the art. Thus, the arrangement of the upper bearing 215a and lower bearing 215b and guide features 127, 128 serve to enable easy rotation of the assembly 210 around the filter 120 in a desired manner.

Referring back to FIG. 4(a), the cleaning surfaces 212 are depicted as a plurality of squeegees. Each squeegee is arranged to clean a different step of the filter 120. In one configuration, three frame elements 211 can be arranged at equally spaced intervals around cleaning assembly 210 to enable cleaning of the stepped filter 120. As depicted here, a number of smaller squeegees are arranged such that each squeegee has a surface in contact (or near contact) with an associated step of the stepped filter 120. Alternatively, the cleaning structure 212 can comprise one single cleaning surface or a number of different configurations. A few such configurations will be discussed later in this application. Alternatively, the cleaning structure can include one or more brush elements rather than the aforementioned squeegees. Also, referring back to the embodiment of FIG. 1, the filter 120 can be substantially frusto-conical in shape thus requiring only a single cleaning structure per frame element and enabling the cleaning surface of the cleaning structure to be substantially linear in configuration, thereby enabling a single cleaning structure 212 to extend from one end to the other of the frame element 211 to enable cleaning of the entire filter 120. In still other embodiments, a cylindrical or single stepped filter may be used and the cleaning structures may be designed to complement the surface of the filter.

Figure 5:
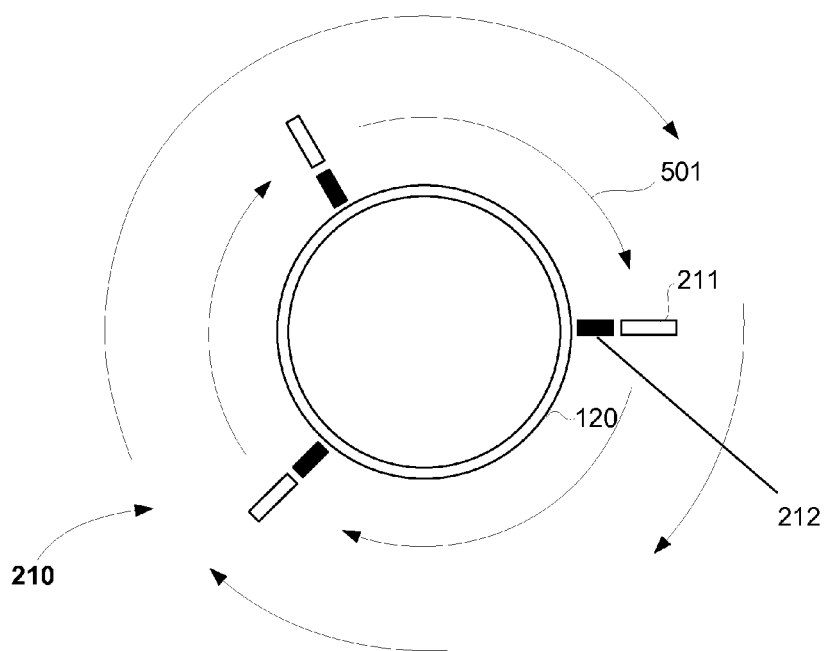
FIG. 5 is a diagrammatic top view illustrating the operation of a circulating cleaning assembly as it rotates about a filter in accordance with the principles of the invention.

FIG. 5 is a simplified depiction of a portion of a section view of the assembly shown in FIG. 4(a) and taken along A-A. In this depiction, the assembly is shown in a hydroclone vortex flow 501. The cleaning assembly 210 is shown with the cleaning structures 212 coupled with the frame element 211 and arranged in close proximity to or in contact with the filter surface 120. The fluid flow around the filter (the vortex 501) impels a rotational motion to the cleaning assembly 210 enabling the assembly to spin around the filter 120. The rotation enables the cleaning surfaces 211 to clean the facing surfaces of the filter element 120. In the illustrated embodiment, the cleaning assembly includes three radially spaced cleaning structures 212. However, it should be appreciated that more or fewer cleaning structures can be provided as appropriate for any particular application. By way of example, experiments have shown the 12 or 24 radially spaced cleaning assemblies work well in a number of specific applications. Thus it should be appreciated that the actual number of cleaning structures used in any particular application can be widely varied, although it is generally contemplated that numbers on the order of two to 50 radially spaced cleaning structure would be appropriate for most applications. In the illustrated embodiments, the cleaning structures are each generally arranged to extend in a plane that intersects the vertical axis of the filter assembly. However in other embodiments, the cleaning structures may be generally helical or take other appropriate configurations.

In one approach, the bearing is a lubricious self-centralizing bearing configured to maintain the bearing (and cleaning assembly) orientation with the support surface and also the associated filter element 120. The bearing is configured to have a generally annular facing surface facing inwardly toward the support surface. The support surface and bearing annular surface are spaced apart a small distance to define a small gap between the two surfaces. A set of flexible members extend from the generally annular surface of the bearing into the space defined by the small gap. In two examples, the members can extend inward from the annular surface of the bearing to contact the outer surface of the support surface. Alternatively, it is contemplated that the members can outwardly away from the annular surface into contact with a circumferential inward facing support surface that surrounds the bearing. The members press against the support surface to maintain the bearing (and hence the cleaning assembly 210) in contact with the support surface (e.g., the filter assembly). The members also enable a self-centralizing feature that maintains the assembly in substantial coaxial alignment with the filter 120.

In particular, some embodiments of the invention use flexible resilient members 215 arranged such that they provide a variable centering force to the cleaning assembly. Such resilient members can be moved or bent from an original shape when subjected to a force but return to their original shape and configuration when the force is reduced or removed. As used here, the variable centering force describes a property of the bearing that pushes the bearing back to a generally centralized position with varying force depending on the amount of deviation from the centralized position. In one example, as the bearing is pushed off center toward one side of the bearing this compresses the flexible resilient members on an opposite side of the bearing. As the compression (and hence the associated deviation from centralized alignment) becomes greater, the flexible members under compression become harder to compress as they are bent further by the deviation. In complementary fashion, the members on the other side extend as the pressure on that side is reduced. Thus, the compressed members push back with increasing force as they are compressed by the deviating alignment of the bearing. Accordingly, the increased force urges the bearing back into the desired alignment. Thus, depending on the compression or extension of the members caused by bearing deviation a variable "righting force" corrects the position of the bearing. Thus, the members provide a variable centering force on the bearing that actively operates on the bearing continually pushing the bearing back into a substantially central orientation. It is worth pointing out that the variable centering force becomes greater as the displacement away from a centralized orientation becomes greater.

Moreover, unlike a journaled bearing, which presents a tight fit and near perfect continual alignment with the associated journal surface, these bearing embodiments are subject to a slight (or in some cases pronounced) wobble during use. This wobble is continually corrected by the variable centering force applied by the members. Accordingly, the bearings and their associated systems can operate in environments that are subject to considerable perturbation away from centralized positioning and still operate as well as actively operate to return the bearings to said centralized position.

Further alternative modes of operation and or working arrangements between a member bearing surface and a support surface are contemplated. The flexible set of resilient members arranged to expel particulate materials from the space between the support surface and a surface during rotational operation of the bearing. It is also specifically contemplated that the members enable a wear tolerant bearing that can maintain the bearing (hence the associated cleaning assembly 210) in centralized location coaxial to the filter assembly 120, even after considerable wear on the members of the bearings.

One example of such a bearing embodiment will be discussed as follows. FIG. 6(*a*) is a top down view of the apparatus such as depicted in FIG. 4(*a*). The depicted view shows an upper one of the particulate tolerant fluid bearings 215*a* of the invention. Although specifically described with reference to the upper bearing 215*a*, the same description generally applies to the lower bearing 215*b* as well. The bearings 215*a* are arranged form part of the cleaning assembly 210. Such bearings 215*a* are configured to maintain the cleaning assembly 210 in axial alignment with the filter as the assembly spins around the filter 120. Moreover, due to the nature of highly contaminated fluid environments, a high degree of particulate contamination is present in the hydroclone during ordinary operation. This particulate contamination will find its way into virtually all known bearing types. Such particulate matter interferes with the smooth operation of the bearings and is also quite capable of damaging the bearings. A common means of keeping particulate out of a bearing is the use of a seal or wiper, but these items typically create a high friction. The described bearings 215 maintain smooth operation and low friction in highly contaminated fluid environments.

A bearing 215 is designed to rotate around a support surface 125 (such as a support surface 127 of a filter assembly 200). The bearing is configured to smoothly rotate around a support surface 125 while maintaining good alignment. The alignment is a substantially centralized alignment. A support surface 125 can be positioned to coaxially align an associated filter element 120 with a cleaning assembly 210. In one convenient embodiment, the support surface 125 comprises a portion of the filter assembly 200. One such example of this application is shown in FIG. 4(*a*) where support surface 125 comprises an element of the filter element 120. In this depiction, the bearing 215*a* is positioned to rotate around the support surface 125 of the filter element 120. It is again pointed out that the bearing support surfaces 125 can comprise any of a number of surfaces of the hydroclone and are not limited to the filter assembly. In the depicted embodiment, the bearing 215*a* and a support surface 125 are arranged to enable the cleaning assembly 210 to rotate substantially coaxially around the filter 120 to enable close proximity of the cleaning surfaces 212 to the filter 120.

Referring again to FIG. 6(*a*), the bearing 215*a* is shown positioned radially around a support surface 125. The bearing 215*a* defines a space 218 between the bearing 215*a* and the support surface 125. As shown in this depiction the bearing 215*a* is comprised, in general, of two portions (216, 217), a generally annular outer body portion 216 (also referred to herein as a support ring) and a set of flexible resilient members 217 that extend into the space 218 between the bearing 215*a* and the support surface 125. The flexible members 217 extend inwardly away from the outer body 216 into contact with the inner support surface 125. In the depicted embodiment, the flexible members 217 extend away from the outer body 216 into compressive contact with the inner support surface 125 sufficient to bend the members 217 when the bearing is installed. This compressive contact bends the members 217. This bend maintains a pressure on the support surface 125 that enables a self-aligning feature that keeps the bearing 215a self-centralized on the support surface 125. In operation in accordance with one embodiment of the invention, this means that the bearing 215a (and its component members 217) maintains the cleaning assembly 210 in a self-centralized alignment with the filter 120. Moreover, this compressive contact means that, as portions of the bearing members 217 wear away, the compressive contact still maintains the bearing 215a (and hence the cleaning assembly 210) in a centralized location with respect to the associated filter 120.

It is pointed out that although the depicted embodiment is shown with eighteen members, it is specifically not limited to such. It is contemplated that embodiments having three or greater members are well adapted for use in accordance with the principles of the present invention. Preferred embodiments include six or more members.

Generally, the members 217 inwardly extend away from the annular outer body 216 such that member tips 223 of the members 217 trail the base 222 of the member during rotation. Thus, the member tips 223 trail away from the direction of rotation during use. A circled portion 221 of FIG. 6(a) shows an embodiment that illustrates the members 217 in greater detail in 221 as shown in the expanded view FIG. 6(b).

Continuing with FIG. 6(c), a simplified side view illustrates an embodiment of the bearing 215a in position to enable coaxial rotation around an example support surface 125.

With further reference to FIG. 6(d), a perspective view of the bearing 215a shows that the generally annular outer portion 216 of the bearing 215a may include a flange 230 used for securing the bearing 215a to the cleaning assembly 210. In a preferred embodiment, the flange 230 does not have sharp edges that can snag on contaminants as it spins in the unfiltered fluid of the hydroclone. The depicted embodiment shows a flange 230 having smooth features that reduce the likelihood of the flange snagging material in the hydroclone fluid. In one embodiment such a smooth featured flange 230 comprises the depicted "shark's tail" configuration. Additionally, in some embodiments, a lower surface 237 of the flange 230 has a streamlined curved shape. This streamlined surface 237 is arranged on the downward side of the bearing 215a such that when it is hit by the fluid of the vortex, the vortex fluid is deflected generally downward.

The flange 230 includes a leading edge 231 that extends outward from the outer edge of the outer body 216. The leading edge 231 further extends at an angle away from a direction of motion (e.g., 501) of the cleaning assembly 210 (see, for example, FIG. 6(a)). The flange 230 may also include attachment features 232 that enable the attachment of the bearing 215a to the frame 211 of the cleaning assembly 210. As depicted here, the attachment feature 232 comprises a generally square aperture in the flange 230. A frame element supporting cleaning structures can be inserted into the attachment feature 232 and secured to assemble the cleaning assembly 210. Several embodiments of such an assembly will be discussed later in this specification. Also note that the bearing 215a can be formed as an integral part of a uniform single component cleaning structure 210. It should be pointed out that this depicted embodiment is merely one application of a broader invention.

The flexible members 217 are advantageous for preventing jamming or binding when particulate and other contaminants from the fluid enter the space 218 between the support surface 125 and the bearing 215a. This contamination can cause the bearing to seize up, or at least considerably impede the rotation of the cleaning assembly. The presence of flexible members 217 in the bearing 215a enables the members to flex when impeded or otherwise in contact with particulates or other contaminative obstacles. By such flexing the members 217 can either flow easily over or eject such particulate matter from the space 218 between the bearing 215a and support surface 220. Advantageously, when the particulate matter is ejected during ordinary operation of the hydroclone there is no serious impediment to the operation of the cleaning assembly 210.

Attractive member materials are those that are resilient enough to perform in the sometimes unforgiving fluid environments that the hydroclone will be subjected, and yet flexible enough to readily eject particulate matter that find themselves between the bearing and support surface. In one embodiment, polyoxymethylene materials can be used to form the bearing and/or the members. Such materials are water and chemical resistant and have sufficient flexibility. One example of such a material is Delrin® produced by DuPont (E. I. du Pont de Nemours and Company, of Wilmington, Del.). Also, Teflon® and other suitable materials can be employed. In one embodiment, the members 217 can be formed of polyoxymethylene and the annular portion 216 can be formed of another more resilient material such as polycarbonate. One example of such a material is Lexan® produced by Sabik Innovative Plastics, (based in Saudi Arabia) or Calibre® produced by Dow Chemicals (of Midland, Mich.). In another implementation, useful in, for example, the petroleum industry, the bearing materials can comprise materials that are flexibly resistant and also resistant to hydrocarbons or petrochemical byproducts and materials.

It is also pointed out that the extreme tolerance to operation in contaminated environments also lends itself to operation in low RPM environments such as may be found in a hydroclone. For example, the bearings described herein operate well at virtually any RPM. Although, suitable for operation at any RPM, the bearings here can be operated in the range of 10-200 RPM with little difficulty.

FIG. 6(e) depicts one example of a two material configuration of the bearing 215a. Referring to section C-C of FIG. 6(d), FIG. 6(e) shows the annular outer body portion 216 with a recess 235 sized to receive a member retaining structure 236 that includes the members 217. The fit between these two structures 235, 236 can be very tight to secure the members 217 to the annular portion 216. A wide range of other arrangements and structural combinations can be employed to construct a bearing 215a having flexible members 217 and the desired properties.

It is pointed out that different member configurations can also be employed in the various embodiments of the invention. For example, FIGS. 7(a)-7(c) illustrate one embodiment having members 702 with a substantially straight blade. For example, a portion of a bearing 700 (such as bearing 215a described, especially, in FIGS. 4(a) & 6(a)) showing the outer body portion 701 (also referred to herein as the ring body 701) of the bearing and the members 702 is shown. In the depicted embodiment, the members 702 are formed in a substantially straight configuration with no substantial twisting as the member extends from base 703 to member tip 704. It is noted, that in this particular embodiment the blade faces of the members 702 become wider as they extend from base 703 to tip 704. This feature is not necessary to practice the invention, but merely describes a possible configuration.

Continuing with a description of FIG. 7(a), the members 702 extend from the ring body 701 at a non-tangential angle. This means that the members 702 extend inward from the body 701 toward a support surface (e.g. an interior support surface 125 like that shown in FIG. 6(a)) at a non-tangential angle. This feature can be illustrated a shown in FIG. 7(a). A tangent 711 for the ring body 701 is shown. Also, the angle θ of the member 702 to the tangent 711 is shown. In general, the angle θ can range from just over 0° to about 90°. The idea being to provide a range of movement for the member in use. The angles preferably range from about 15° to about 60°. In a particular embodiment, it is suggested that an angle θ should be greater than at 15°. One particularly useful embodiment has an angle θ of about 30°. Generally, these members do not extend normally inward from the tangent. However, it is contemplated that such embodiments are possible and do form part of the invention. Generally, the members extend backwards generally away from the direction of bearing rotational motion 501 (See, e.g., FIG. 6(a)). As will be apparent to the skilled artisan, many other angles may be used in accordance with the principles of the invention.

In addition, a cross-section view E-E is shown in FIG. 7(c) to illustrate that in some embodiments, the flat blade portion of member 702 maintains a constant pitch (does not twist) as it extends from member base 703 to tip 704.

FIGS. 8(a)-8(c) illustrate another embodiment having members that include a portion of the member that twists as it extends away from the outer body portion 801 of the bearing. FIGS. 8(a)-8(c) depict a portion of a bearing 800 (such as bearing 215a described, for example, in FIGS. 4(a) & 6(a)) showing the generally annular body portion 801 of the bearing and the members 802. In the depicted embodiment, the members 802 are formed having a twist as they extend toward the end of the member. In one embodiment the twist can include a generally helicoid or propeller shaped configuration. Additionally, the twist need not comprise the entire length of the member 802. Accordingly, the member 802 has a twisting surface (or both surfaces) as the member 802 extends from base 803 (the point closest to the annular portion 801) to member tip 804. It is noted, that in this particular embodiment the members 802 become wider as they extend from base 803 to tip 804. The tip 804 is also shown with a rounded configuration. Flat ends are also specifically contemplated by the invention. It is pointed out that the twist of the members need not extend for the entire length of the members 802. In one alternative embodiment (not shown in this view), the twisting members extend toward a support surface (e.g., 125 of FIG. 6(a)) whereupon the member tip becomes substantially free of twisting geometry providing a substantially flat contact surface against the support surface 125. These configurations provide a few illustrative embodiments and the invention is not confined to the depicted embodiments.

Cross-section view F-F is shown in FIG. 8(c) which is used to illustrate the twisting nature of the member 802. As the member 802 extends down the member toward member tip 804 the blade (member) twists radially about an axis of extension for the member. This is illustrated in FIG. 8(c) which shows the changing pitch of surfaces of the member 802 as the member extends from the base toward the tip. Thus, depending on the point along the member section F-F is taken from, the angle φ will change.

Figure 9A:
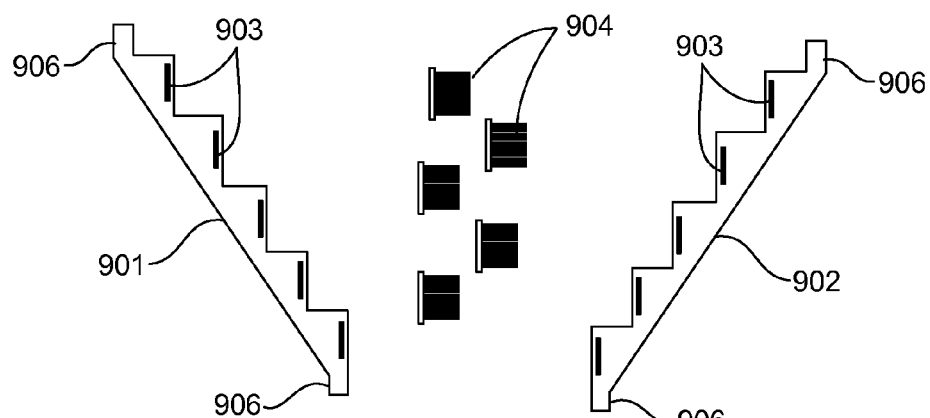
FIGS. 9(a)-9(d) are various diagrammatic views illustrating a cleaning assembly comprising a number of brackets that are assembled with a cleaning structure into a frame element that is coupled with bearings to form one embodiment of a cleaning assembly.

Many different approaches and geometries for a cleaning assembly 210 are contemplated in accordance with the principles of the present invention. FIGS. 9(a)-9(d) illustrate an embodiment of a cleaning assembly frame element suitable for use with the invention. In FIG. 9(a) a pair of complementary frame brackets 901, 902 are depicted. Each bracket is configured to be assembled together with its complementary portion and suitable cleaning structure(s) 904 to form a mated pair and a completed frame element 905 which is assembled with a pair of bearings 215 to form an assembled cleaning assembly 210 for use in accordance with the principles of the present invention.

Each bracket 901, 902 may include a securement feature 903 arranged to enable the securing of a cleaning structure 904 when the brackets are assembled. Here, in FIG. 9(a), the bracket 901, 902 are stepped brackets each having a number of stepped features arranged with a plurality of securement features 903 arranged to hold one or many cleaning structures 904 in place on the assembled frame assembly 905. In one example, the many securement features 903 of the brackets 901, 902 may simply comprise slots arranged to such that when the brackets are coupled together they fix a set of cleaning structures 904 in place on the now assembled frame element 905. In the illustrated embodiment, only one bracket has the securement feature with the other bracket having no such feature. Also, in some embodiments the bracket can have attachment features 906 that enable the bracket to be coupled with other elements.

Figure 9B:
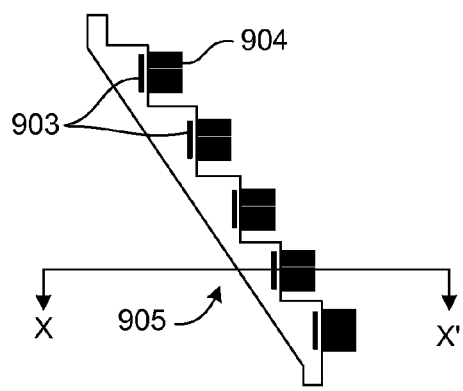
Figure 9C:
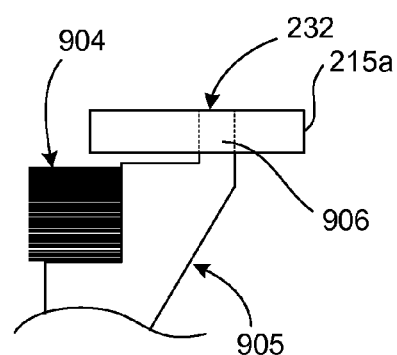

FIG. 9(b) provides an illustration of one embodiment of the assembled frame element 905. Additionally, in this embodiment the frame element 905 includes attachment features 906 that enable the frame 905 to be coupled with bearings of the cleaning assembly (e.g., 210). In one embodiment of such an attachment feature, each bracket 901, 902 includes an attachment tab 906 that extends from either end of the bracket. During fabrication, each of the assembled frame elements 905 are coupled with associated bearings by engaging the tabs 906 with a complementary attachment feature on each bearing. In one example, such a complementary attachment feature is the aperture 232 formed on bearing 215a (by way of example, see FIG. 6(a) or 6(d)). In one approach, the tabs 906 can simply be press fitted into the apertures 232 of a suitable bearing 215a. Alternatively, or additionally, they can be further secured using adhesives or other means if desired. The attachment features are not limited to just the depicted tabs. Many other attachment modes are contemplated by this disclosure and the invention is not intended to be limited to just those embodiments shown. Many other assembly approaches will be apparent to the skilled artisan.

Figure 9D:
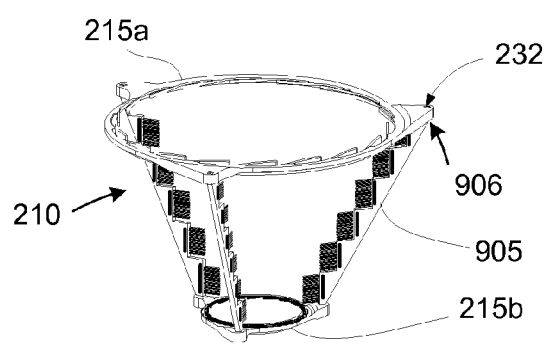

One example of a fully assembled cleaning assembly 210 is shown in FIG. 9(d). The assembled frame elements 906 are assembled with the bearings 215a, 215b using the tabs 906 to engage the complementary attachment features 232 of the bearings.

Figure 10A:
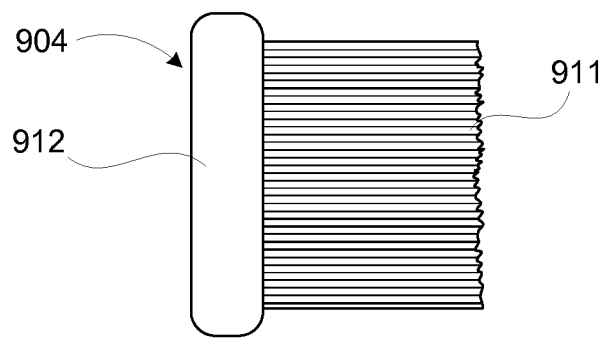
FIGS. 10(a)-10(b) diagrammatically illustrate a cleaning element secured in an assembled frame element for use in accordance with the principles of the present invention.

FIG. 10(a) illustrates a simplified view of one example cleaning structure 904. Here the structure 904 includes a cleaning portion 911 and an attachment portion 912. In this embodiment, the cleaning portion 911 can comprise a set of brush bristles affixed to the cleaning structure by an attachment portion 912 comprising a simple clasp 912. However, this is but one simplified embodiment, with many others readily discernable to those of ordinary skill. By way of another example, the cleaning structure 904 is a squeegee type structure having a squeegee cleaning portion 911 on one end and an attachment portion 912 on the other. In one embodiment, it is advantageous that the attachment portion 912 is wider than the other cleaning portion 911.

Figure 10B:
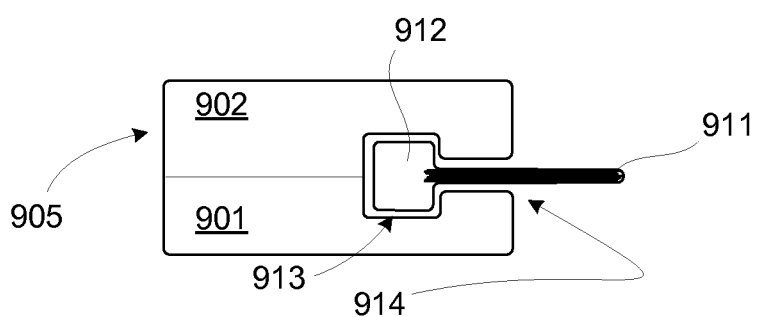

FIG. 10(b) is a simplified section view of the frame element 905 and associated cleaning structure 904 as taken from X-X' of FIG. 9(b). The securement feature 903 is arranged with a wider portion 913 securing the attachment portion 912 of the cleaning structure 904 in place. A narrower neck portion 914 enables a narrower portion of the cleaning portion 911 to pass through while still securely affixing the attachment end 913 of the cleaning structure 904. The assembly 905 can be reversibly secured together or permanently affixed. For example, the two brackets 901, 902 can simply be adhered together with a suitable adhesive. In one example a polymethyl methacrylate adhesive could be used to affix all of the components in place. A wide range of materials and approaches can be used to assemble the apparatus' described herein and does limit themselves to the specific embodiments disclosed herein.

In another embodiment, only one of the brackets (e.g., 901) requires a securement feature 903. In one such example, the opening 913 can be formed deeper into the bracket 901 allowing a larger aperture for the cleaning structure (e.g., 911, 912) to rest in. The mated bracket (e.g., 902) can merely have a flat surface that closes off the opening in the other bracket when assembled. Thus, by affixing the two brackets together, the cleaning structure will still be fixed in place. Additionally, an amount of adhesive can also be introduced into the securement feature to further secure the cleaning structure in place. For example, the securement feature can be filled with an epoxy and the cleaning structure adhered in place. In fact the entire assembly could be epoxied together and cured to construct an assembled frame element 905.

Figure 11A:
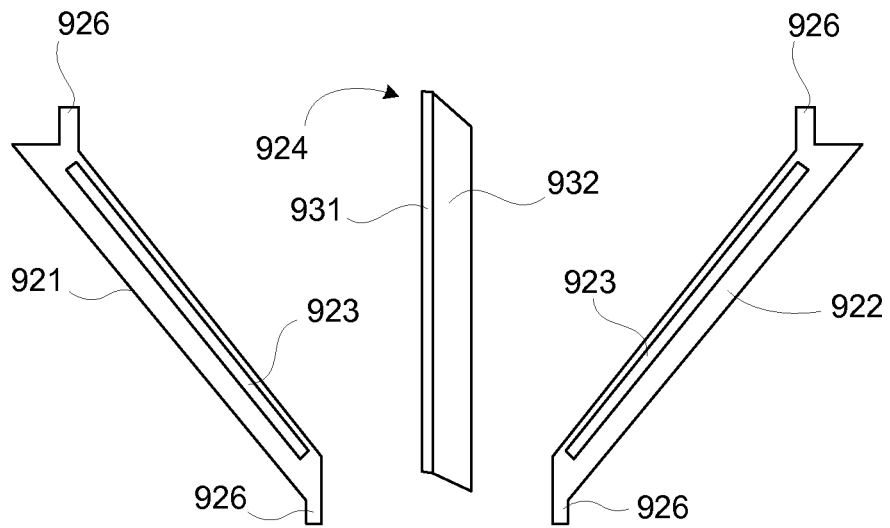
FIGS. 11(a)-11(b) diagrammatically illustrate the components of another cleaning frame element suitable for use with a single cleaning structure in accordance with the principles of the present invention.
Figure 11B:
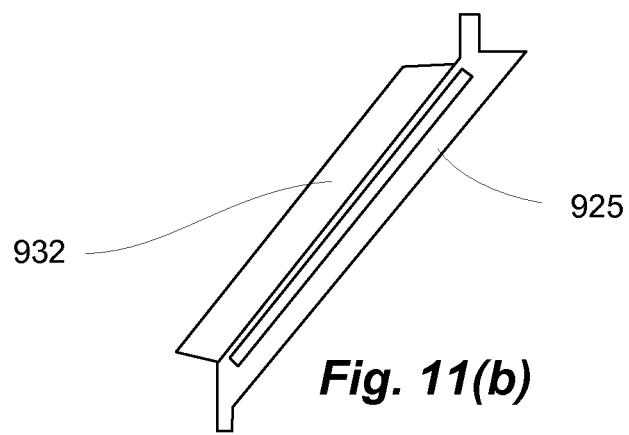

FIGS. 11(*a*)-11(*b*) illustrate another cleaning assembly frame element embodiment suitable for use with the invention. FIG. 11(*a*) depicts a pair of complementary frame brackets 921, 922 having a set of securement features 923. As before, each bracket is configured to be assembled together with its complementary portion and, in this case, secure a single cleaning structure 924 to the completed frame element 925. As before, this frame element 924 an be assembled with a pair of bearings to form an assembled cleaning assembly 210 for use in accordance with the principles of the present invention. An example of such an application is illustrated with respect to FIG. 1.

Similar to embodiment discussed above, one, or as shown here, both of the brackets 921, 922 can include a securement feature 923 arranged secure a cleaning structure 924 in place when the brackets are assembled. In the depicted example, the cleaning structure 924 comprises a long attachment portion 931 and an accompanying long cleaning portion 932 that are secured in place much the same as the cleaning structures 904 described above. Here, as before, coupling features 926 are also present on this embodiment to enable engagement of the frame 925 with other portions of the cleaning assembly 210 (most notably the bearings 215).

FIG. 11(*b*) provides an illustration of one embodiment of the assembled frame element 925. As before, the frame element includes attachment features 926 that enable the frame 925 to be coupled with bearings of the cleaning assembly (e.g., 210). As previously indicated an attachment tab 926 can be used to engage associated bearings 215 by engaging the tabs 906 with a complementary attachment feature on each bearing. The illustrated complementary attachment feature (aperture 232) is but one example. As before, the tabs 906 can be press fitted, adhered, mechanically affixed, or otherwise attached with a cleaning assembly 210 such as, for example, shown in FIGS. 1 and 2.

Figure 12A:
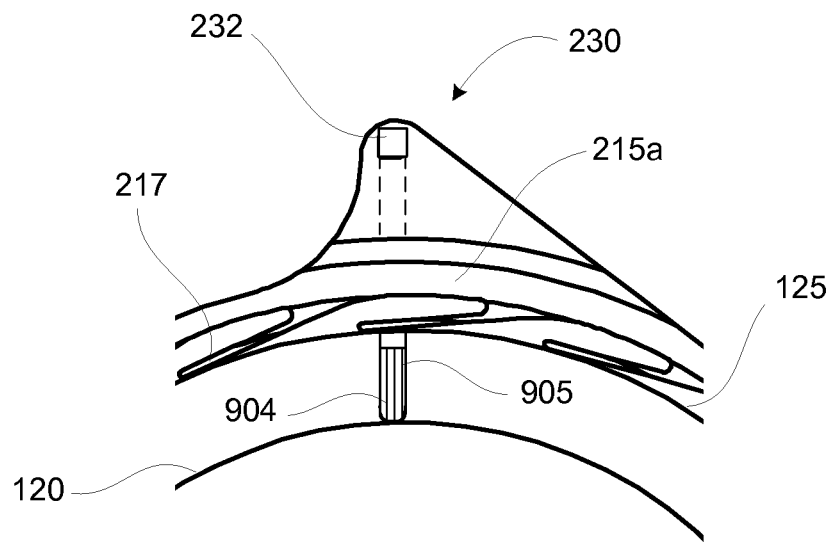
FIGS. 12(a)-12(b) illustrate some embodiments of engaging a frame element with a bearing to arrange the cleaning element of the frame in a desired orientation relative to the bearing or an associated filter in accordance with the principles of the present invention.
Figure 12B:
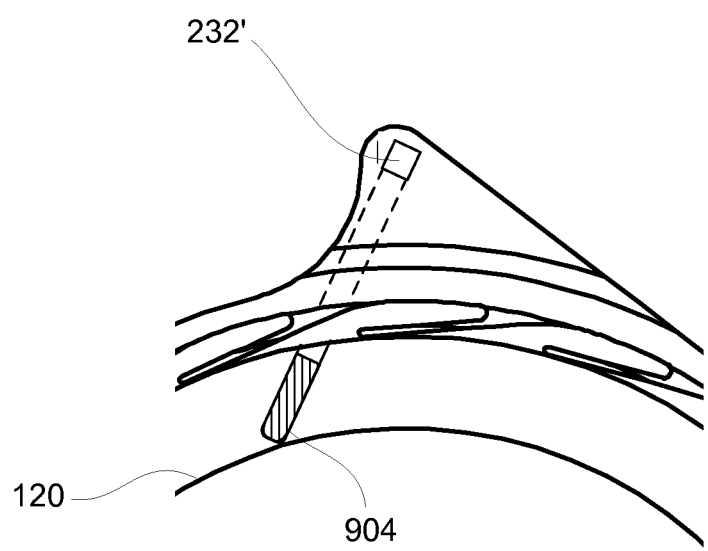

Another attribute of the invention is describer with respect to FIGS. 12(*a*) and 12(*b*). FIG. 12(*a*) is a diagrammatic view of a bearing configured, for example, like that of FIG. 6(*a*) or FIG. 9(*d*). In this particular depiction, the bearing (e.g., 215*a*) is depicted with the members 217 in contact with an example support surface 125. In this embodiment the depicted flange 230 includes bearing attachment feature 232. As can be appreciated by the skilled man, the attachment feature can have many permutations and configurations. The only requirement being that the feature 232 be suitable to fixedly engage a mated complementary frame attachment feature (e.g., feature 906 of FIG. 9(*a*)). One example of such a feature us detailed above with respect to FIGS. 9(*a*) and (*b*). When the brackets 901, 902 are assembled and ready for incorporation into a cleaning assembly, the frame attachment feature (e.g., 906) is engaged with the complementary feature 232 of the bearing (e.g., 215*a*) to form a cleaning assembly (e.g., 210).

In the embodiment depicted in FIG. 12(*a*) the bearing attachment feature 232 is, for example, a square aperture 232 formed in the flange 230 of the bearing. In one implementation the complementary frame attachment feature 906 can simply be a generally square end tab configured for engagement with the aperture 232. In FIG. 12(*a*), the tab 906 of frame element 905 is press fit into the aperture 232 to couple the two elements 215*a* and 905. In this depiction, the frame element is arranged at an angle normal to a tangent associated with the bearing (or a filter surface of the filter assembly 120). Accordingly, a cleaning structure 904 is contact (or near contact) with the filter element 120 to enable cleaning.

FIG. 12(*b*) suggests an alternate configuration. In this depiction, the bearing attachment feature 232' is still, for example, a square aperture 232 formed in the flange 230 of the bearing. However, in this implementation the orientation of the aperture 232' is rotated a selected amount. This rotation changes the orientation of the frame 905 so that the cleaning surface 904 engages the filter 120 at an angle other than normal to the tangent.

As can be appreciated by those of ordinary skill, many different angles of orientation can be provided for the frame 905 as can many different approaches for coupling the bearing and the frame.

Figure 13:
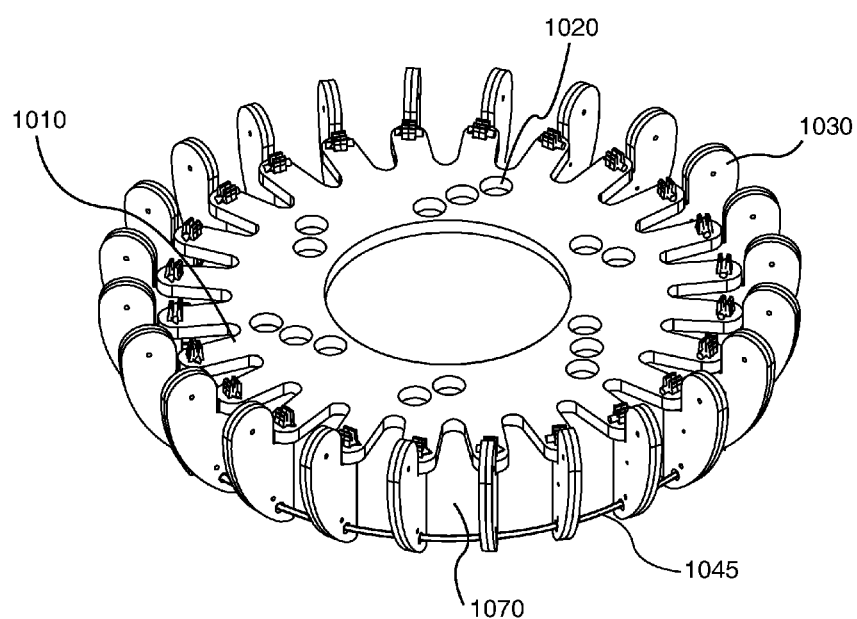
FIG. 13 is a diagrammatic perspective view of a cleaning assembly in accordance with another embodiment of the invention that doesn't show the adaptor plates.
Figure 14:
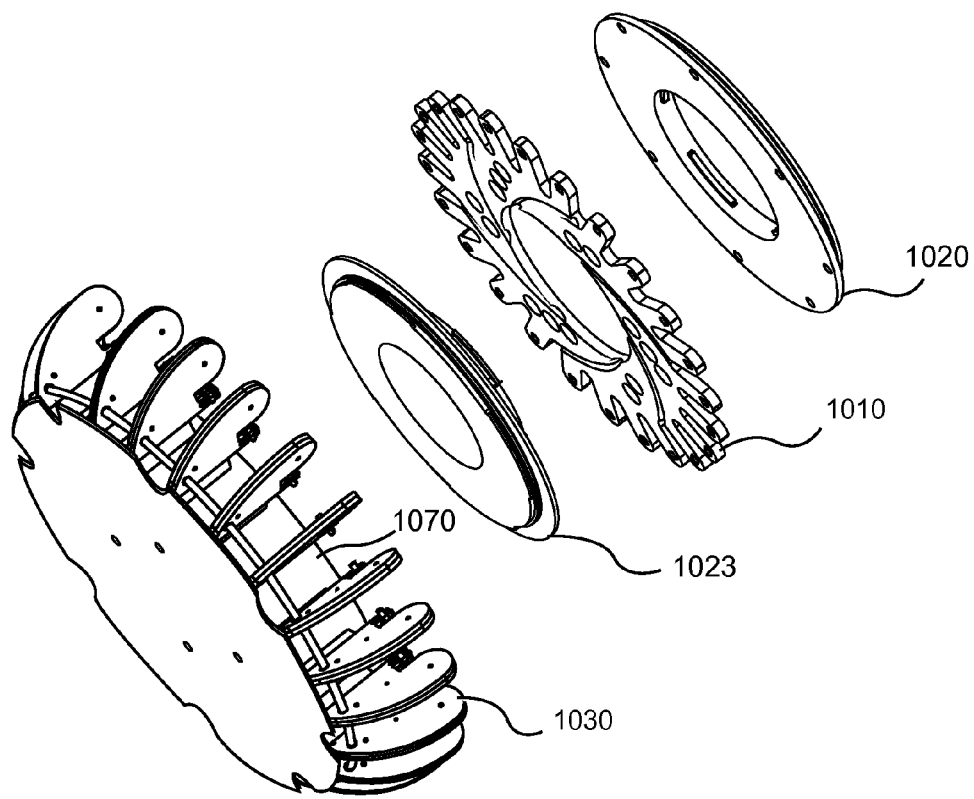
FIG. 14 is an exploded view of the cleaning assembly of FIG. 13 together with a cylindrical filter.
Figure 15:
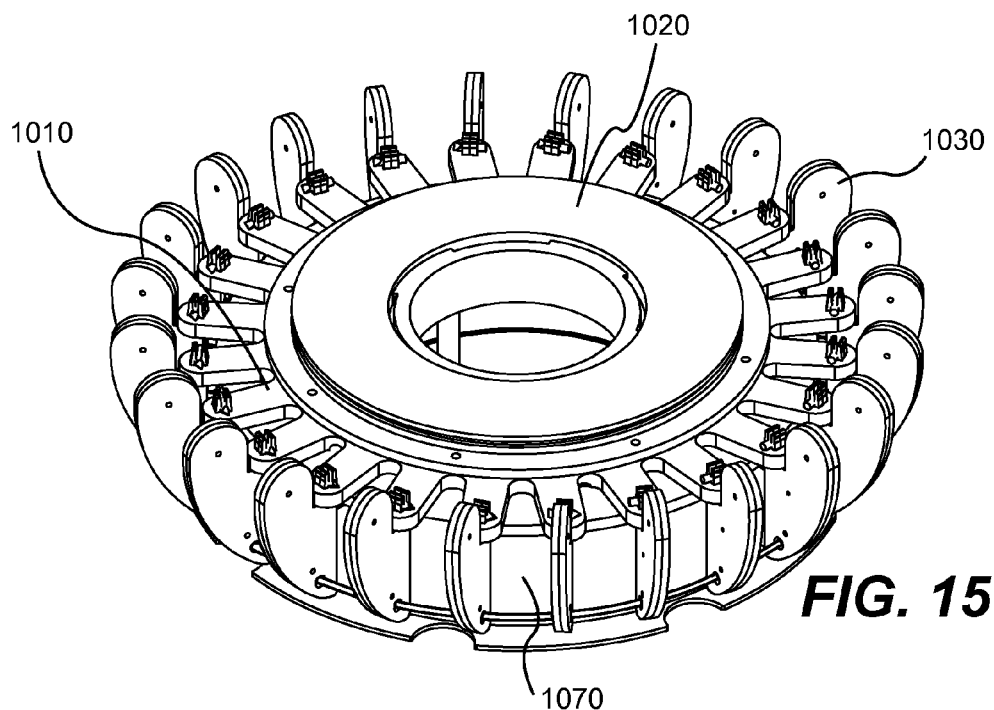
FIG. 15 is a diagrammatic perspective view of the cleaning assembly of FIG. 13 mounted on a cylindrical filter.

Referring next to FIGS. 13-15 another alternative cleaning assembly 1000 that utilizes is a very different particulate tolerant bearing arrangement will be described. In the illustrated embodiment, the cleaning assembly 1000 includes a single bearing plate 1010 having a multiplicity of cleaning structure support arms 1012. The bearing plate 1010 is positioned between a pair of adapter plates (i.e., top adapter plate 1020 and bottom adapter plate 1023) and is journaled about a race 1024. The adapter plates 1020, 1023 serve to constrain axial movement of the bearing plate 1010 as it rotates about the race 1024. In the illustrated embodiment, the race 1024 is integrally formed with the bottom adapter plate 1023, although in alternative embodiments, the race could be integrally formed with the top adapter plate 1020 or could be formed as separate element.

The cleaning structure support arms 1012 each support an associated cleaning structure 1030. Each cleaning structure has a frame 1031 that supports a cleaning element 1033. As described previously, the cleaning elements 1033 may take the form of brushes, squeegees, or any other suitable cleaning element. At least some of the cleaning structures also have integrated paddles 1035 that help drive rotation of the cleaning assembly about the filter 1070 as will be described in more detail below. A retaining hoop 1045 is arranged to stabilize bottom ends of the cleaning structures 1030 and cooperates with the bearing's cleaning structure support arms 1012 to maintain the desired alignment of the cleaning structures 1030.

Figure 16:
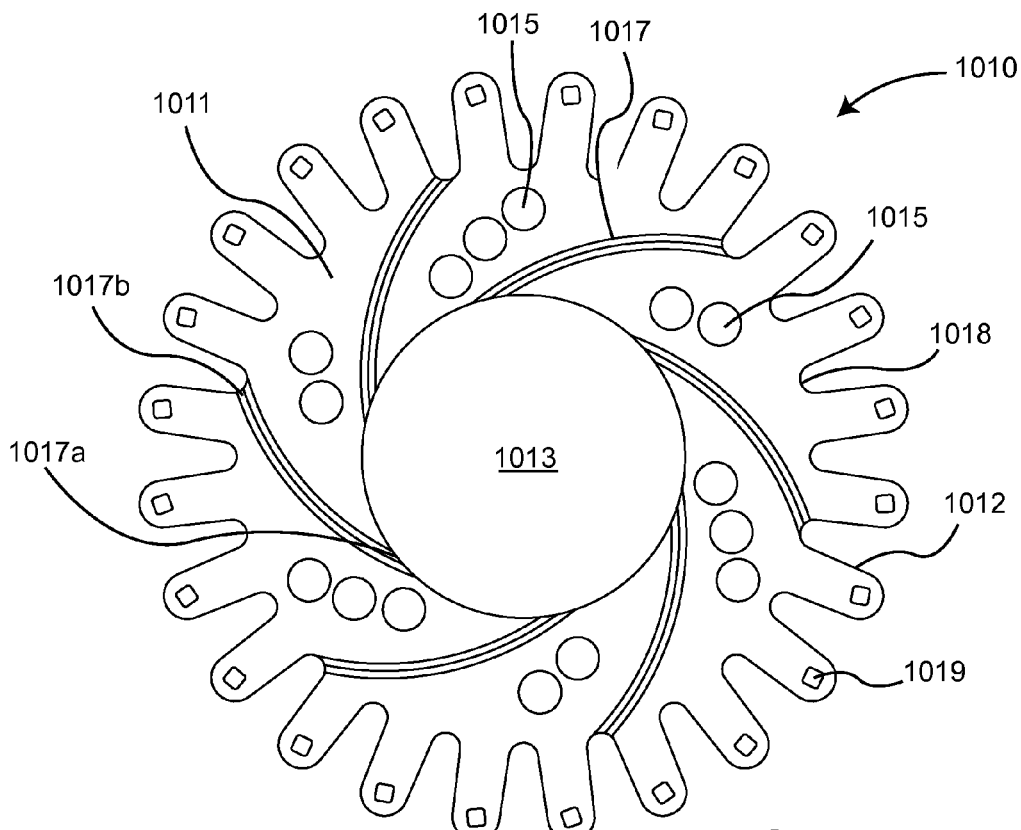
FIG. 16 is a top view of a particulate tolerant bearing plate suitable for use in the cleaning assembly of FIG. 13.
Figure 17:
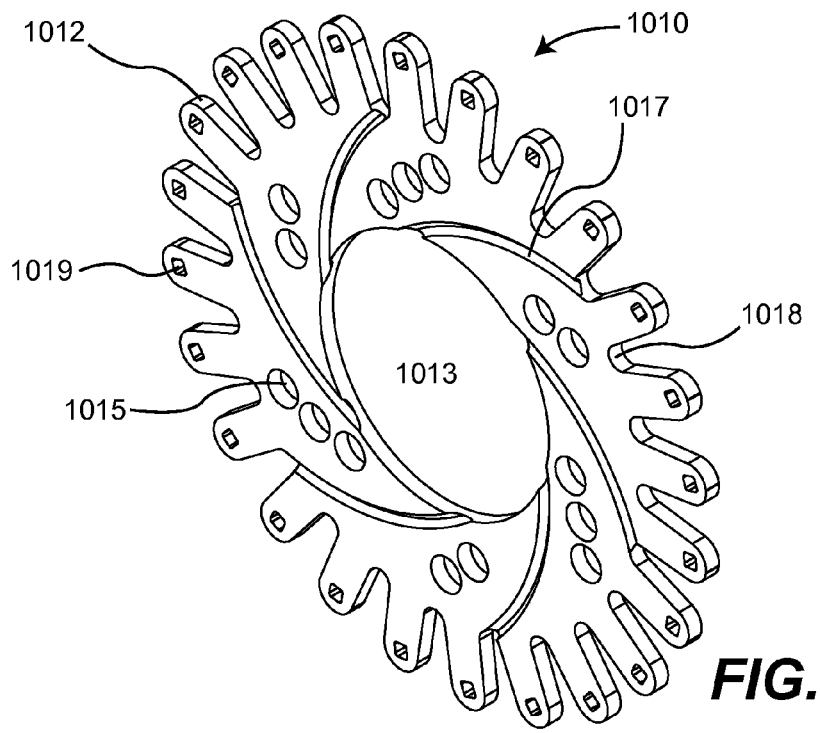
FIG. 17 is a perspective view of the particulate tolerant bearing plate of FIG. 13.

FIGS. 16 and 17 illustrate the design of one representative embodiment of the bearing plate 1010. The illustrated bearing plate 1010 is generally radially symmetrical and includes a main body 1011 having a central opening 1013, and a plurality of support arms 1012 that extend radially outward from the main body 1011. The main body 1011 of the bearing is journaled about race 1024 to permit rotation of the bearing plate about the race. When assembled, the adapter plates 1020, 1023 sandwich the bearing so as to constrain its vertical movement. It has been observed that in some hydroclone applications, the bearings can be subjected to very strong downward forces from the vortex, particularly when the hydroclone is operated in a manner that periodically dumps sludge while the hydroclone continues to operate. Accordingly, the bearing plate is preferably formed from a relatively strong and rigid material and the main body is relatively wide to provide good structural strength to the bearing. The interface between the bearing and the adapter plates are also preferably relatively wide to provide good structural support for the bearing.

A number of holes 1015 extend through the main body in the region between adapter plates. These holes 1015 are believe to reduce the rotational friction between the bearing and the adapter plates. The holes 1015 are also believed to help promote the expulsion of particulates that get sucked into one of the gaps between the adapter plates and the bearing. In the embodiment shown, six sets of holes re dispersed throughout the main body of bearing 1010, with each set having two or three holes. However, it should be appreciated that the specific size, spacing and number of holes may be widely varied to provide the desired operating characteristics for any particular use.

The bottom surface of the bearing also has a plurality of arcuate channels 1017 formed therein. The illustrated channels 1017 extend between the central opening 1013 and the outer periphery of the main body 1011 at an associated notch 1018 between a pair of adjacent support arms 1012. The channels are arranged such that the end of the channel 1017a adjacent the central opening 1013 rotationally leads the end of the channel adjacent the outer periphery of the main body when the bearing is spun in operation. With this arrangement, particulates that become trapped between the bearing 1010 and adapter plate 1023 are generally drawn into the channels and are then generally expelled through the channels by the forces generated by the rotation of the bearing. This self-cleaning characteristic of the bearing plate 1010 helps make the bearing particulate tolerant which is extremely useful in applications where a cleaning structure rotates about a filter assembly such as in hydroclone and other centrifugal separation enhanced filtration applications. The actual number of channels employed in any particular embodiment may be widely varied. By way of example, on the order of 3-20 channels are believed to be appropriate for many applications, although more or fewer channels can be used successfully.

Similar channels (not shown) may also optionally be provided in the top surface of the bearing 1010 to help facilitate the expulsion of particulates trapped in the gap between the bearing 1010 and top adapter plate 1020. It is believed that the bottom channels tend to have a larger impact than the top channels. This is due to the fact that in many designs, particulates are more likely to enter the space between the bearing and the bottom adapter plate than the bearing and the top adapter plate. Furthermore, the holes 1015 tend to permit trapped particulates to migrate from the top gap towards the bottom gap. Although the flow dynamics imparted by the holes are not fully understood, it is suspected that the holes introduce a certain level of turbulence in the gaps between the bearing and the adapter plates that helps prevent particulates from getting trapped in those spaces. It should be appreciated that the buildup of particulates in the gaps is highly undesirable since they tend to increase the friction between the bearing and the adapter plates, thereby reducing the rotational speed of the bearings and thus the overall performance of the cleaning assembly.

The bearing plate 1010 is preferably formed from a lubricious material as discussed above with respect to other described bearings. By way of example, oil impregnated, ultra-high molecular weight polyethylene has been found to work well as the bearing plate 1010 material. Such a polyethylene is also well suited for use in other bearing structures contemplated in this application.

The illustrated bearing plate 1010 has 24 support arms 1012 arranged symmetrically about the periphery of the plate. It should be appreciated that the actual number of support arm provided in any particular embodiment may vary widely, although it is highly desirable to insure that the bearing is balanced to reduce the risk of generating undesirable vibrations. By way of example, it is believed that in the range of 2 to 50 support arms would be appropriate for most applications, although more or fewer support arms can be provided in other specific applications.

Each of the support arms 1012 is preferably arranged suitably to support an associated cleaning structure 1030. However, there is no need for all of the support arms to actually hold an associated cleaning structure in commercial implementations. Rather, the actual number of cleaning structures used in any particular application may be varied to meet the needs of the application. In applications in which the filter membrane is subject to relatively rapid clogging it may be desirable to employ a relatively large number of cleaning brushes, whereas in applications where clogging of the filter membrane is slower, using relatively fewer cleaning brushes may be more than adequate and facilitate longer filter life.

It should be appreciated that the illustrated 24 support arm bearing is particularly useful because 2, 3, 4, 6, 8, 12 or 24 cleaning structures 1030 can be symmetrically placed about the bearing with the intermediate support arms being skipped. This permits the bearing, and cleaning assembly as a whole, to remain balanced while allowing the turboclone to be customized to provide the number of cleaning structures that are appropriate to meet the needs of a variety of specific applications. Of course bearings having other highly composite (i.e., versatile) numbers of support arms (e.g., 6, 8, 12, 36, 48 etc.) are well suited for such customization as well.

Figure 18:
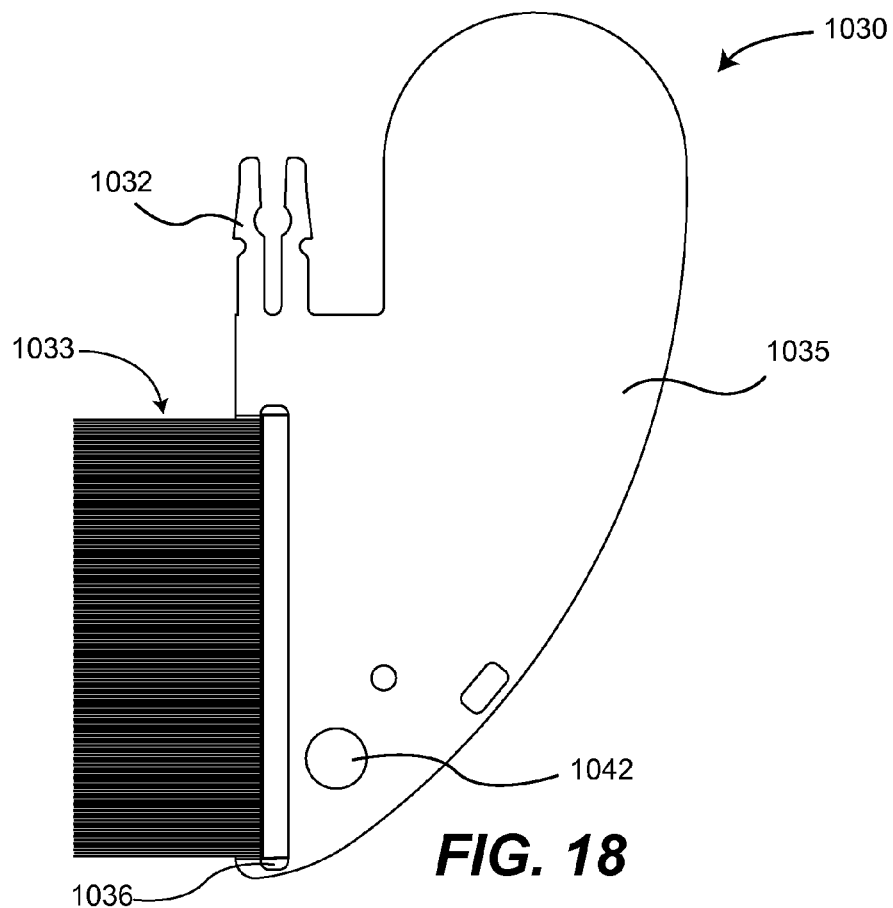
FIG. 18 is a side view of a cleaning structure that includes a brush holder with an integrated paddle and a brush as the cleaning element.
Figure 19:
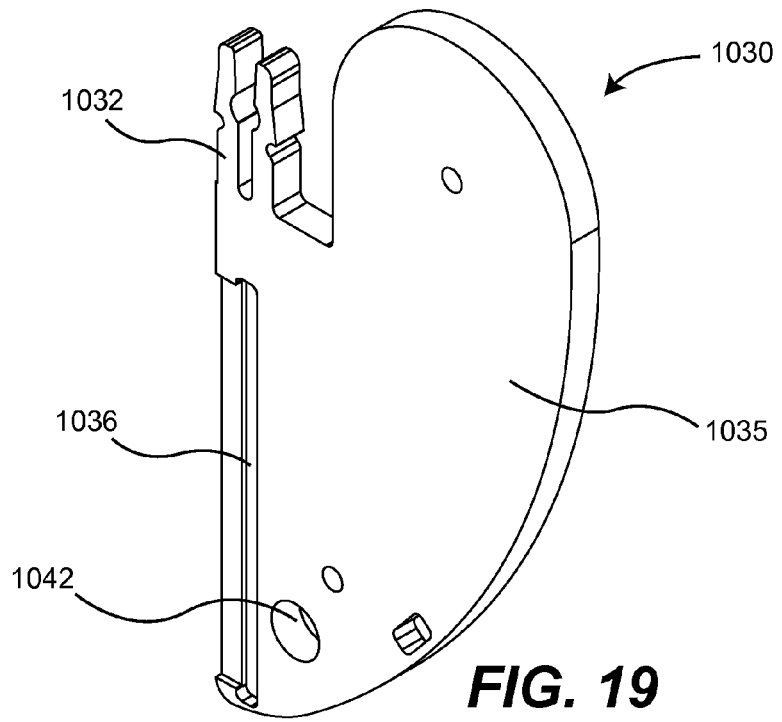
FIG. 19 is a perspective view of the brush holder frame of FIG. 18 without the brush attached.

Referring next to FIGS. 18 and 19, a modular cleaning structure suitable for use in conjunction with the illustrated cleaning assembly will be described. The illustrated cleaning structure 1030 includes a frame 1031 having an integrated clip 1032, paddle 1035, support slot 1036 and alignment hole 1042. The cleaning element 1033 illustrated in FIG. 18 takes the form of a brush that clamps onto the frame 1031 and thus the frame 1031 effectively serves as a brush holder, although again, squeegees or a variety of other cleaning elements may be used in place of the brush.

The clip 1032 is arranged to engage a clip receiving hole 1019 in the associated bearing support 1012 arm to snap the cleaning structure 1030 into place. Alignment hole 1042 receives support hoop 1045 to stabilize the brush holder frame 1031 and thus the brushes 1033 during operation. In the illustrated embodiment, the clip 1032 and the paddle 1035 are integrally formed with the frame 1031 although this is not a requirement.

The paddles 1035 are enlarged surfaces that are designed to drive the rotation of the cleaning assembly during operation. In the embodiment illustrated in FIG. 15, the filter takes the form of a single stage cylindrical filter 1070 that is mounted to the top or cover portion of a hydroclone or centrifugal separator such as the hydroclone illustrated in FIGS. 1 and 3. That is, the cylindrical filter is used in place of the tapered or stepped filters 120 illustrated in FIGS. 1, 2 and 4(*a*). In this configuration, much of the filter is positioned in line with the fluid inlet. The inlet fluid stream thus effectively drives the rotation of the cleaning assembly as in enters the hydroclone chamber 110 by striking and pushing the paddles. The geometry of the paddles may be widely varied to insure that they encounter the forces from the inlet fluid stream/vortex that are necessary to provide the torque necessary to rotate the cleaning assembly at the desired speed.

In the embodiment illustrated, each of the brush holder frames 1031 includes an integrally formed paddle 1035. However in applications in which a large number of brushes are used, higher rotational speeds can be obtained under the same operating conditions by interspacing some brush holders that forego the paddles (not shown) with brush holders that include the paddles. For example, in applications where 24 brush holders are used, it has been found that outfitting every other brush holder 1030 with a paddle delivers better rotational speed than outfitting every brush holder with a paddle. This is believed to be due to the fact that positioning the paddles too close to each other tends to reduce their exposure to the inlet stream/vortex, thereby reducing their overall effectiveness. The paddleless brush holders can be designed very similarly to the paddled version with the simple elimination of the paddle portion of the brush holder frame. Of course a wide variety of other brush holder frame designs may be used as well.

It has also been found that the speed of the cleaning assembly can be increased by arranging the brush holders 1031 such that the paddles are angled a small amount relative to a radial axis at the with the distal tip of the paddle being angled into the fluid stream/vortex. By way of example, offset angles in the range of 10-30 degrees, as for example 20 degrees seem to work well.

Figure 20A:
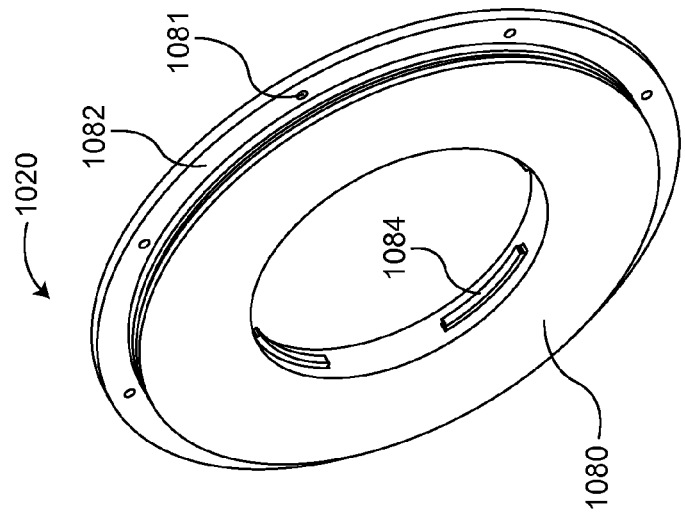
FIGS. 20(a)-20(c) are respectively perspective, top and side views of a top adapter plate.
Figure 20B:
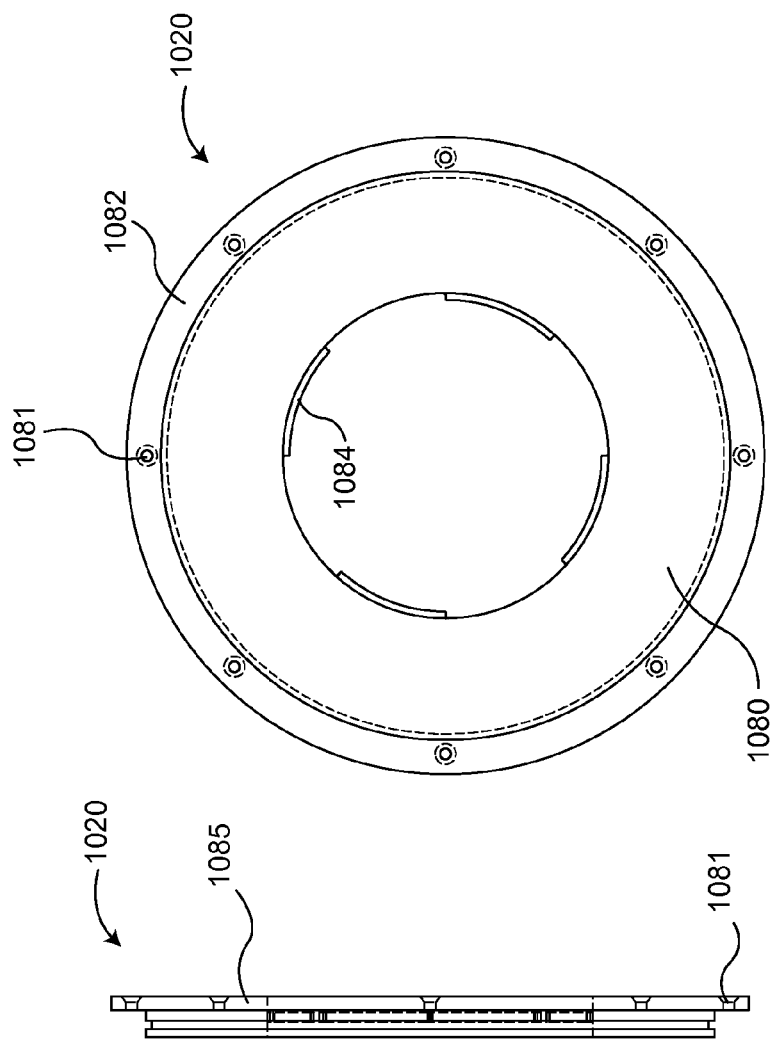
Figure 20C:

As mentioned above, the bearing plate 1010 is sandwiched between a pair of adapter plates 1020, 1023 that hold the bearing and thus indirectly, the cleaning assembly 1030 in place during operation. One suitable embodiment of the top adapter plate 1020 is illustrated in FIGS. 20(*a*)-20(*c*). The top adapter plate 1020 has a base plate 1085, a raised seal support 1086 and a central opening 1087. The seal support 1086 includes a peripheral groove 1088 that is arranged to receive an O-ring seal (not shown). The top adapter plate 1020 also has a plurality of fastener holes 1081 on a flange 1082 that is part of a base portion of the adapter plate. The fastener holes 1081 are arranged to receive fasteners that permit the adapter plate to be screwed, bolted or otherwise fastened to the hydroclone lid 109 or to any other suitable base. When attached, the raised seal support 1086 extends tightly into a corresponding recess or opening in the lid and the O-ring serves to seal the interface between the top adapter plate and the lid opening. The central opening 1087 of the adapter plate allows any desired plumbing to extend through the adapter plate into the filter chamber. The inner bore walls of the base plate 1085 or raised seal support 1086 have spaced apart, radially inward projecting ridges 1089 formed thereon that cooperate with complementary projections on the lower adapter plate 1023 to form bayonet style locks that are used to couple the adapter plates together. The base plate 1085 and the seal support 1086 and their accompanying components can be formed either integrally or as separate parts, although an integral formation of the entire top adapter plate 1020 is generally preferred.

Figure 21A:
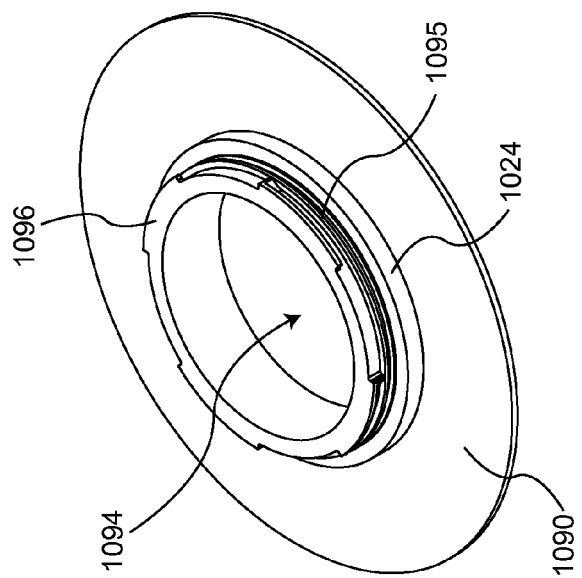
FIGS. 21(a)-21(c) are respectively perspective, top and side views of a bottom adapter plate.
Figure 21B:
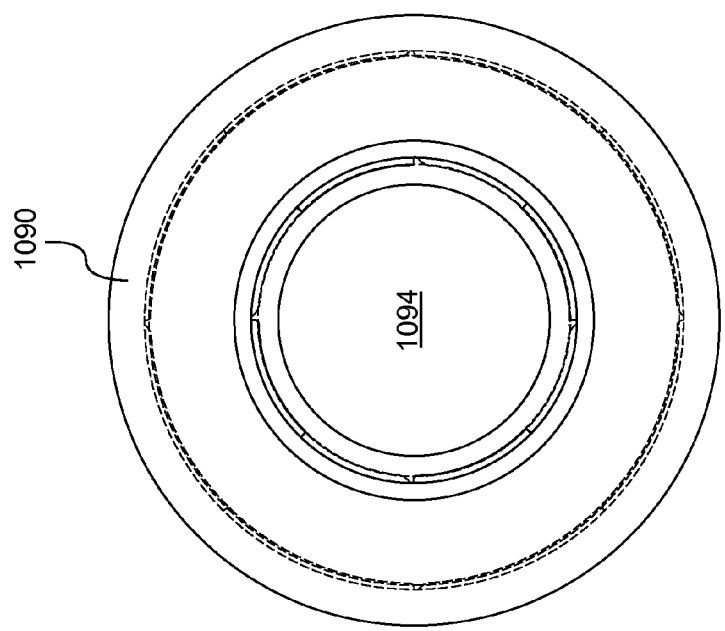
Figure 21C:
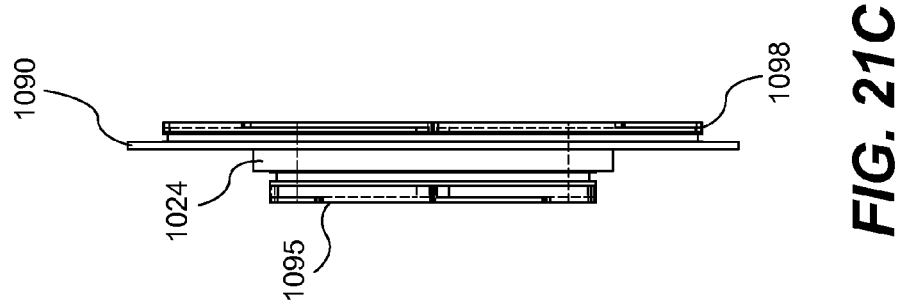

A suitable embodiment of the bottom adapter plate 1023 is illustrated in FIGS. 21(*a*)-21(*c*). The bottom adapter plate 1023 has a base plate 1090, the bearing race 1024, a central bore 1094, an adapter plate coupling structure 1095 and a filter interface 1098. Like the top adapter plate, the bottom adapter plate is preferably fabricated as a single integrated unit, although again, some of the components could be fabricated as separate parts if desired. The race 1024 has a substantially smaller diameter than the base plate 1090 and is preferably sized such that bearing plate 1010 journals about the race with small clearance tolerances. The base plate 1090 together with the bottom surface of the upper adapter base plate 1085 serve as support surfaces for the rotating bearing plate 1010.

The coupling structure 1095 having an outer diameter that is smaller than the race 1024 extends above the race 1024. The coupling structure has a plurality of bayonet projections 1096 on its peripheral surface that receive the ridges 1089 on the top adapter plate to releasably couple the adapter plates together using a bayonet style coupling. Of course, a variety of other conventional coupling arrangements could be used in place of the described bayonet coupling.

The filter interface 1098 extends from the bottom surface of the base plate 1090 and is arranged to engage and/or support the filter 1070. The filter may be attached to the bottom adapter plate by bayonet couplers or by other suitable means. Alternatively, the filter can be supported separately from the adapter plate if desired.

The actual rotational speed of the cleaning assembly during use will vary as a function of a number of factors including the drive mechanism used to rotate the cleaning assembly, the design of the bearings and cleaning assembly used in any particular device and the operational condition of the hydroclone or centrifugal separator. Generally, cleaning assembly rotational speeds on the order of 20-500 rpm have been found to work well in many water filtration applications and rotational speed on the order of 170-250 rpm are sometimes preferred. These rotational speed are readily obtained in high throughput hydroclones using the described paddles as the drive mechanism.

It should be appreciated that the described cleaning assemblies and filter cleaning approaches permit the filter to be swiped very frequently during operation. The actual number of sweeps per second will vary as a function of both the rotational speed of the cleaning assembly and the number of brushes (or other cleaning elements) used. By way of example, if a cleaning assembly rotates at 210 rpm and has 3 brushes, the filter will be swiped at least 10 times each second. Rotating the cleaning assembly at the same speed with 12 brushes provides 42 sweeps per second, whereas the use of 24 brushes provides 84 sweeps per second. Thus it should be appreciated that the described bearing and cleaning assembly structures allow the filter membrane to be very aggressively swept during operation of the hydroclone or centrifugal separator.

In many applications wiping the filter just a few times per second (e.g. 2-10) times per second is plenty to provide the cleaning necessary to keep the filter operating efficiently. However, there are some applications where sweeping the filter more frequently (e.g. on the order of 25-100 times per second, or more) can significantly improve the filter's overall performance. It should be appreciated that the described bearing plate, together with the modular cleaning structure, provide a low cost and highly reliable mechanism for providing that level of performance.

Although only a few embodiments of the invention have been described in detail, it should be appreciated that the invention may be implemented in many other forms without departing from the spirit or scope of the invention. For example, although the invention has been described primarily in the context of circulating cleaning assemblies that rotate about a static filter in a hydroclone filter, it should be apparent that the cleaning assemblies are well suited for use in any type of liquid based centrifugal filters wherein the carrier fluid flows rotationally about the filter regardless of whether the. Thus, the described cleaning assemblies and bearings can readily be used in cylindrical separators where the carrier fluid chamber is cylindrical or has any other suitable geometry. That is, the invention is not limited to use hydroclones having tapered sidewalls in the hydroclone chamber or that generate a classic vortex within the hydroclone chamber. The invention can also be used in hydroclones and/or other surface filter based separators in which the filter is rotated and the cleaning elements are held in place or in which both the filter and the cleaning assembly are arranged to rotate. What is important is that there is generally annular relative movement between the brushes/cleaning elements and the filter surface.

In the explanations set forth above only a few specific applications of the hydroclone/separator have been described. However, it should be appreciated that the described structures may be used in a wide variety of other filtering applications. Additionally, there are some applications where it is desirable to concentrate particles that are suspended within water (or other fluids) in order to recover the particles. A hydroclone that has been plumbed for recirculation of the effluent stream is particularly well adapted for use in such concentrating applications, particularly when the hydroclone is operated in the periodic purge mode. In these applications, it may be the concentrated purged fluids that contain the effluent of interest.

Although specific components of the hydroclone such as specific filters, cleaning assemblies, and intake structures have been described, it should be appreciated that the various devices may be used in combination or together with other suitable components without departing from the spirit of the present inventions. Therefore, the present embodiments are to be considered as illustrative and not restrictive and the invention is not to be limited to the details given herein, but may be modified within the scope and equivalents of the appended claims.

What is claimed is:

1. A centrifugal separation enhanced filtration device comprising:
   a tank having a fluid inlet, a filtered fluid outlet, an effluent outlet and an internal chamber having an internal chamber wall;
   a filter membrane positioned within the internal chamber, there being a fluid circulating region in a space between the internal chamber wall and the filter membrane;
   a circulating cleaning assembly positioned in the fluid circulating region between the chamber wall and the filter membrane, wherein the circulating cleaning assembly includes at least one cleaning element arranged to clean the filter membrane when rotated about the filter;
   at least one bearing that carries the circulating cleaning assembly and is arranged to enable the circulating cleaning assembly to rotate around the filter membrane during filtering operation of the filtration device, wherein the at least one bearing is arranged to maintain the circulating cleaning assembly in a substantially coaxial alignment with the filter membrane and in a substantially stable longitudinal position relative to the filter membrane as the circulating cleaning assembly is rotated around the filter membrane; and
   wherein the at least one bearing includes a bearing plate arranged to rotate together with the circulating cleaning assembly, wherein the bearing plate is journaled about a race.

2. A filtration device as recited in claim 1 wherein the bearing plate includes a central opening that is faces the race and a plurality of throughholes in a main body portion of the plate that permit particulates to pass between opposite sides of the bearing plate.

3. A filtration device as recited in claim 1 wherein:
   the bearing plate is sandwiched between a pair of adapter plates that constrain axial movement of the bearing plate; and
   the race is integrally formed with one of the adapter plates.

4. A filtration device as recited in claim 1 wherein:
   each bearing of the at least one bearing has a plurality of circumferentially spaced apart cleaning structure support arms; and
   the cleaning assembly includes a plurality of distinct cleaning structures that are carried by the bearing, each cleaning structure including an associated cleaning element arranged to swipe over or against the filter membrane to clean the filter membrane as the cleaning assembly rotates relative to the filter.

5. A filtration device as recited in claim 4 wherein each cleaning structure includes a clip arranged to snap into the bearing and the cleaning element is selected from the group consisting of:
   a brush that contacts the filter membrane;
   a squeegee that contacts the filter membrane; and
   a structure that does not physically contact the filter membrane but causes sufficient agitation of fluid located between the cleaning structure and the filter to effectively clean the surface of the filter.

6. A filtration device as recited in claim 1 wherein the cleaning assembly includes a plurality of paddles positioned such that at least one of a fluid inlet stream and circulatory motion of a fluid within the fluid circulating region drives the rotation of the cleaning assembly.

7. A filtration device as recited in claim 1 wherein the at least one bearing includes a first bearing and a second bearing that is spaced apart from the first bearing, the first and second bearings being arranged to carry the circulating cleaning assembly and cooperate to maintain the circulating cleaning assembly in a substantially coaxial alignment with the filter assembly and in a substantially stable longitudinal alignment with the filter assembly as the circulating cleaning assembly is rotated around the filter assembly.

8. A filtration device as recited in claim 7 wherein each bearing of the first and second bearings includes including a support ring and a multiplicity of flexible resilient members extending inward from the support ring.

9. A filtration device as recited in claim 1 wherein the at least one bearing is formed from a lubricious material selected from the group consisting of: (a) an oil impregnated polyethylene; and (b) polyoxymethylene.

10. A filtration device as recited in claim 1 configured as a hydroclone filtration device, wherein:
   the tank has a substantially frusto-conical section;
   during operation, a vortex is formed about the filter membrane; and
   the filter membrane is part of a filter assembly that has a filtered fluid chamber located in a central region of the vortex.

11. A filtration device as recited in claim 1 configured as a cylindrical centrifugal separation enhanced filtration device, wherein:
   the tank has a substantially cylindrical section;
   the filter membrane is part of a filter assembly positioned within the substantially cylindrical section; and during operation, a feed liquid to be filtered circulates around the filter membrane.

12. A filtration device as recited in claim 1 wherein the filter membrane is a surface filter membrane.

13. A filtration device as recited in claim 1 wherein the filter membrane is positioned within the tank such that the filter membrane acts as a cross-flow filter during filtering operation of the filtration device.

14. A filtration device as recited in claim 1 wherein:
the filter membrane is a surface filter that is part of a filter assembly positioned within the tank and the flow of a liquid fluid being filtered rotationally circulates around the filter membrane such that the filter membrane acts as a cross-flow filter; and
during filtering operation of the filtration device the cleaning assembly is driven rotationally about the filter membrane by the flow of the liquid fluid about the filter assembly and the cleaning elements sweep over or against the surface of the surface filter to help dislodge particulates that are trapped by pores in the filter membrane.

* * * * *